United States Patent
Zhao et al.

(10) Patent No.: US 11,297,398 B2
(45) Date of Patent: Apr. 5, 2022

(54) WATERMARK-BASED METADATA ACQUISITION AND PROCESSING

(71) Applicant: Verance Corporation, San Diego, CA (US)

(72) Inventors: Jian Zhao, San Diego, CA (US); Joseph M. Winograd, San Diego, CA (US); Rade Petrovic, San Diego, CA (US); Julia Ann Kenyon, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 16/625,656

(22) PCT Filed: Jun. 21, 2018

(86) PCT No.: PCT/US2018/038832
§ 371 (c)(1),
(2) Date: Dec. 20, 2019

(87) PCT Pub. No.: WO2018/237191
PCT Pub. Date: Dec. 27, 2018

(65) Prior Publication Data
US 2020/0128303 A1 Apr. 23, 2020

Related U.S. Application Data

(60) Provisional application No. 62/654,128, filed on Apr. 6, 2018, provisional application No. 62/524,426, filed
(Continued)

(51) Int. Cl.
*H04N 21/8358* (2011.01)
*H04N 21/845* (2011.01)
(Continued)

(52) U.S. Cl.
CPC ....... *H04N 21/8358* (2013.01); *H04N 21/434* (2013.01); *H04N 21/643* (2013.01);
(Continued)

(58) Field of Classification Search
CPC ....... H04N 21/23418; H04N 21/23614; H04N 21/434; H04N 21/643; H04N 21/8358;
(Continued)

(56) References Cited

U.S. PATENT DOCUMENTS

| 6,122,610 A | 9/2000 | Isabelle |
| 6,145,081 A | 11/2000 | Winograd et al. |

(Continued)

FOREIGN PATENT DOCUMENTS

| JP | 2004163855 | 6/2004 |
| JP | 2004173237 | 6/2004 |

(Continued)

OTHER PUBLICATIONS

Aris Technologies, Inc. "Audio Watermarking System to Screen Digital Audio Content for LCM Acceptance," May 1999 (17 pages).
(Continued)

*Primary Examiner* — Rong Le
(74) *Attorney, Agent, or Firm* — Donald L. Wenskay

(57) ABSTRACT

The disclosed embodiments relate to media devices implementing new television standards, such as ATSC 3.0, which includes audio/video essence and metadata/signaling. The disclosed embodiments include techniques for creating a signaling file that contains metadata and signaling data about the broadcast service being presented. The signaling file may include URLs that can be used to access signaling information for supplementary signaling and content. The signaling also contains a mapping between a first timing system and a second timing system. The first timing system may comprise the watermark timeline represented in interval s and
(Continued)

Figure 6. Signaling file generator the second timing system may comprise a DASH presentation time.

5 Claims, 23 Drawing Sheets

Related U.S. Application Data on Jun. 23, 2017, provisional application No. 62/523,164, filed on Jun. 21, 2017.

(51) Int. Cl.
    *H04N 21/434*      (2011.01)
    *H04N 21/858*      (2011.01)
    *H04N 21/84*      (2011.01)
    *H04N 21/643*      (2011.01)

(52) U.S. Cl.
    CPC .......... *H04N 21/84* (2013.01); *H04N 21/845* (2013.01); *H04N 21/8586* (2013.01)

(58) Field of Classification Search
    CPC ... H04N 21/84; H04N 21/845; H04N 21/8586
    See application file for complete search history.

(56) References Cited

U.S. PATENT DOCUMENTS

| | | | |
|---|---|---|---|
| 6,175,627 B1 | 1/2001 | Petrovic et al. |
| 6,427,012 B1 | 7/2002 | Petrovic |
| 6,430,301 B1 | 8/2002 | Petrovic |
| 6,683,958 B2 | 1/2004 | Petrovic |
| 6,792,542 B1 | 9/2004 | Lee et al. |
| 6,888,943 B1 | 5/2005 | Lam et al. |
| 6,931,536 B2 | 8/2005 | Hollar |
| 7,024,018 B2 | 4/2006 | Petrovic |
| 7,159,118 B2 | 1/2007 | Petrovic |
| 7,224,819 B2 | 5/2007 | Levy et al. |
| 7,460,667 B2 | 12/2008 | Lee et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,533,481 B2 | 9/2013 | Petrovic et al. |
| 8,538,066 B2 | 9/2013 | Petrovic et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,923,548 B2 | 12/2014 | Petrovic et al. |
| 9,009,482 B2 | 4/2015 | Winograd |
| 9,055,239 B2 | 6/2015 | Tehranchi et al. |
| 9,106,964 B2 | 8/2015 | Zhao |
| 9,117,270 B2 | 8/2015 | Wong et al. |
| 2007/0039018 A1 | 2/2007 | Saslow et al. |
| 2011/0261667 A1 | 10/2011 | Ren et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0072731 A1 | 3/2012 | Winograd et al. |
| 2012/0102304 A1 | 4/2012 | Brave |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0129303 A1 | 5/2013 | Lee et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0271657 A1 | 10/2013 | Park et al. |
| 2013/0325622 A1 | 12/2013 | Kamitani et al. |
| 2014/0067950 A1 | 3/2014 | Winograd |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0289873 A1 | 9/2014 | Morss et al. |
| 2014/0325550 A1 | 10/2014 | Winograd et al. |
| 2014/0325673 A1 | 10/2014 | Petrovic |
| 2015/0012956 A1 | 1/2015 | Kim et al. |
| 2015/0030200 A1 | 1/2015 | Petrovic et al. |
| 2015/0121534 A1 | 4/2015 | Zhao et al. |
| 2015/0264429 A1 | 9/2015 | Winograd et al. |
| 2015/0325246 A1* | 11/2015 | Pun ...................... G10L 19/018 704/500 |
| 2016/0057317 A1 | 2/2016 | Zhao et al. |
| 2016/0182973 A1* | 6/2016 | Winograd .......... H04N 21/4722 725/25 |
| 2016/0234542 A1 | 8/2016 | Stokking et al. |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011116309 | 9/2011 |

(56) References Cited

FOREIGN PATENT DOCUMENTS

WO 2013163921 11/2013
WO 2014153199 9/2014

OTHER PUBLICATIONS

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

"ATSC-3.0 Automatic Content Recognition Watermarking Solutions," ATSC Technology Group, Advanced Television Systems Committee, Inc., Jan. 2014 (6 pages).

"ATSC Candidate Standard: Service Usage Reporting," ATSC Technology Group, Advanced Television Systems Committee, Inc., Dec. 2015 (15 pages).

"ATSC Candidate Standard: Content Recovery in Redistribution Scenarios," ATSC Technology Group, Advanced Television Systems Committee, Inc., Dec. 2015 (43 pages).

International Search Report and Written Opinion for PCT/US2017/028198, dated Aug. 8, 2017 (13 pages).

International Search Report and Written Opinion for PCT/US2018/038832, dated Oct. 26, 2018 (7 pages).

\* cited by examiner

Figure 1. Server-mediated device pairing process using shared session

Figure 2. Device pairing by application using direct WebSocket communication

Figure 3. Pairing process for legacy device (e.g., HbbTV 1.0 and 1.5)

Figure 4. Pairing process for watermark-capable terminal (e.g., HbbTV 2.01+)

Figure 5. Pairing Server

Figure 6. Signaling file generator

Figure 7. Mappings between watermark interval codes, DASH presentation time and wall clock time Figure 9. App Reporting System Overview Figure 10. Data Preparation Figure 11. Data Processing at the Streaming Client

| Date Range | Timeperiod /Program | Total Live Views |
|---|---|---|
| 10/5 | MF 6p630p | 627,411 |
| 10/6 | MF 6p630p | 525,000 |
| 10/7 | MF 6p630p | 630,000 |
| 10/8 | MF 6p630p | 632,000 |
| 10-5-10/8 | MF 6p630p | 2,414,411 |

Figure 12. Total Live Views by Time Period

FIG. 12

Figure 13. Views by Platform Type

Figure 14. Views by Platform Type Detail

| Date Range | Timeperiod /Program | Live Views in Market | Live Views out of Market | Total Live Views |
|---|---|---|---|---|
| 10/5 | MF 6p630p | 500,000 | 127,411 | 627,411 |
| 10/6 | MF 6p630p | 400,000 | 125,000 | 525,000 |
| 10/7 | MF 6p630p | 500,000 | 130,000 | 630,000 |
| 10/8 | MF 6p630p | 500,000 | 132,000 | 632,000 |
| 10-5-10/8 | MF 6p630p | 1,900,000 | 514,411 | 2,414,411 |

Figure 15. Total Live Views by Time Period and Location

FIG. 15

Figure 16. Views by Location

| Date Range | Timeperiod /Program | AQH | AQH Rating |
|---|---|---|---|
| 10/5 | MF 6p630p | 200 | 0.2% |
| 10/6 | MF 6p630p | 250 | 0.3% |
| 10/7 | MF 6p630p | 300 | 0.3% |
| 10/8 | MF 6p630p | 250 | 0.3% |
| 10-5-10/8 | MF 6p630p | 1,000 | 1.0% |

Figure 17. Total Live QHVs by Time Period

FIG. 17

Figure 18. QHVs by Platform Type

Figure 19. AQH Trend

Figure 20. Live Views by Viewing Duration

| View Duration | Views | % Views |
|---|---|---|
| <5 min | 25,000 | 4.0% |
| 5 mins-10.59 min | 25,000 | 4.0% |
| 11 mins-14.59 min | 100,000 | 15.9% |
| 15 mins-19.59 min | 200,000 | 31.9% |
| 20 mins - 24.59 min | 52,411 | 8.4% |
| 25 mins - 30min | 225,000 | 35.9% |
| Total | 627,411 | 100.0% |

| View Duration | Total Views | WABC | OTT | Mobile | Desktop |
|---|---|---|---|---|---|
| <5 min | 25,000 | 9,000 | 7,000 | 3,500 | 5,500 |
| 5 mins-10.59 min | 25,000 | 9,000 | 3,500 | 7,000 | 5,500 |
| 11 mins-14.59 min | 100,000 | 36,000 | 14,000 | 28,000 | 22,000 |
| 15 mins-19.59 min | 200,000 | 72,000 | 28,000 | 56,000 | 44,000 |
| 20 mins - 24.59 min | 52,411 | 18,000 | 14,000 | 9,000 | 11,411 |
| 25 mins - 30min | 225,000 | 81,000 | 35,000 | 59,500 | 49,500 |
| Total | 627,411 | 225,000 | 101,500 | 163,000 | 137,911 |

Figure 21. View Durations by Platform Type: Tabular View

Figure 22. View Durations by Platform Type: Graphical View

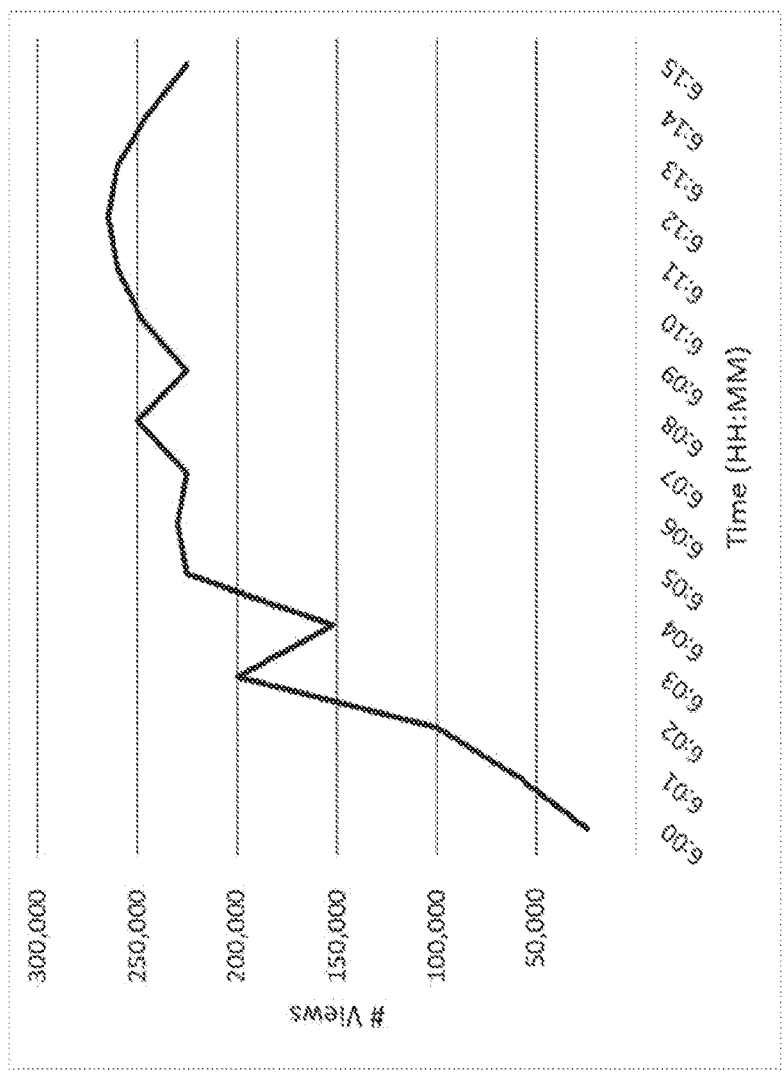
Figure 23. Live Views, Minute by Minute
FIG. 23
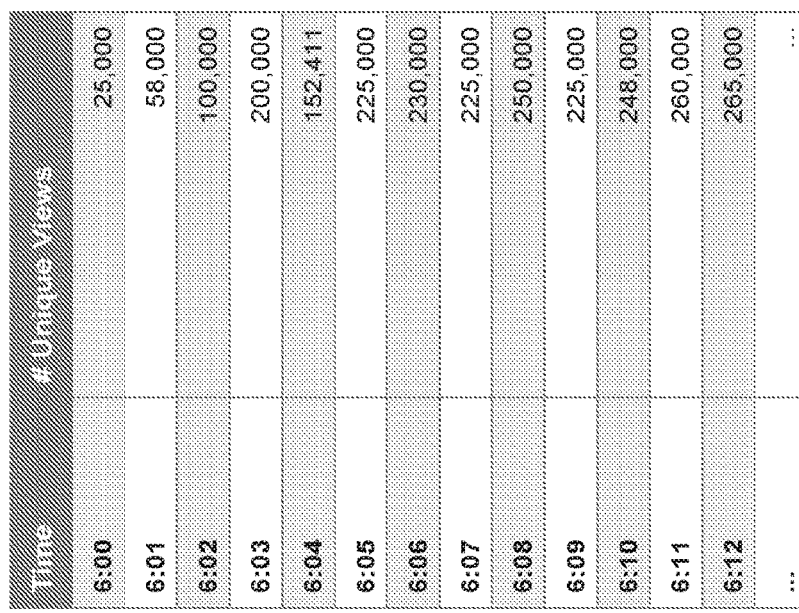

| Time | Total Views | WABC | OTT | Mobile | Desktop |
|---|---|---|---|---|---|
| 6:00 | 25,000 | 8,000 | 1,000 | 15,000 | 1,000 |
| 6:01 | 25,000 | 7,000 | 1,500 | 15,000 | 1,500 |
| 6:02 | 100,000 | 28,000 | 6,000 | 60,000 | 6,000 |
| 6:03 | 200,000 | 50,000 | 15,000 | 120,000 | 15,000 |
| 6:04 | 152,411 | 15,000 | 15,000 | 120,000 | 2,411 |
| 6:05 | 225,000 | 57,000 | 16,500 | 135,000 | 16,500 |
| ... | ... | ... | ... | ... | ... |

Figure 24. Minute by Minute Live Views by Platform Type: Tabular View

FIG. 24

Figure 25. Minute by Minute Live Views by Platform Type: Graphical Views

WATERMARK-BASED METADATA ACQUISITION AND PROCESSING

CROSS REFERENCE TO RELATED APPLICATIONS

This application claims the benefit of priority of U.S. Provisional Patent Application No. 62/523,164 filed on Jun. 21, 2017, U.S. Provisional Patent Application No. 62/524, 426 filed on Jun. 23, 2017, and U.S. Provisional Patent Application No. 62/654,128 filed on Apr. 6, 2018, the entire contents of which are incorporated by reference as part of the disclosure of this document.

FIELD OF INVENTION

The present invention generally relates to the field of devices which transmit, receive and process audiovisual content. More particularly, the disclosed embodiments relate to techniques for watermark-based metadata acquisition and processing.

BACKGROUND

This section is intended to provide a background or context to the disclosed embodiments that are recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

Watermarks can be embedded in audio, images, video or audiovisual content. New television standards, such as HbbTV and ATSC 3.0 allow applications to run on a TV to provide interactive services, targeted advertising with local ad replacement, and audience measurement, video-on-demand, etc. In the HbbTV compliant devices a terminal, such as a television or a set top box (STB) performs application discovery. When application discovery is performed using watermarks, both a STB and a downstream television may attempt to discover the HbbTV service associated with the broadcast. Problems can arise if both the STB and the downstream television launch the HbbTV service. The result may be duplicated or confusing displays on the screen. In addition, there are a variety of redistribution scenarios based on the metadata extracted from the ATSC content comprising audio/video essence as well as metadata/signaling. A signaling file contains metadata and signaling data about the broadcast service being presented, including URLs that can be used to access signaling information for supplementary signaling and content. Signaling files are delivered to the receiver by a recovery server via broadband in the redistribution scenarios. A first timing information is represented as an interval code that identifies the interval of content in which a watermark payload value is embedded. The watermark payload includes at least the following other fields: 1) a server code field that identifies a server which acts as the starting point for acquisition of supplementary content; and 2) a query flag field, which has a value that changes to announce an event or to indicate the availability of a new signaling file. The first timing information extracted from watermarks and second timing information carried in the ATSC content may need to be reconciled.

Furthermore, it is desirable to perform audience measurement of media consumption on media applications. Such apps can be resident on a platform such as Roku, a set-top box (STB), or a digital video recorder (DVR). It is also desirable to perform audience measurement of consumption of content via a web browser.

Audience data that is currently available to broadcasters is not consistent across consumption platforms. Most broadcasters have access to precise viewing data from browsers and mobile devices via Google analytics, Omniture/Adobe analytics, etc. Tools for other platforms (e.g. Roku) don't always provide viewing data with the same level of precision and with additional data as the mobile platforms provide, or if they do, they charge premiums for the information.

As a result, the currently available audience measurement data for application-based viewing is not accepted by advertisers and cannot be used for marketing ad placement in their content.

BRIEF DESCRIPTION OF THE DRAWINGS

FIG. 12 illustrates total live views by time period.

FIG. 15 illustrates total live views by time period and location.

FIG. 17 illustrates total live QHVs by time period.

FIG. 23 illustrates live views minute-by-minute.

FIG. 24 illustrates a tabular view of minute-by-minute live views by platform type.

SUMMARY OF THE INVENTION

Figure 1:
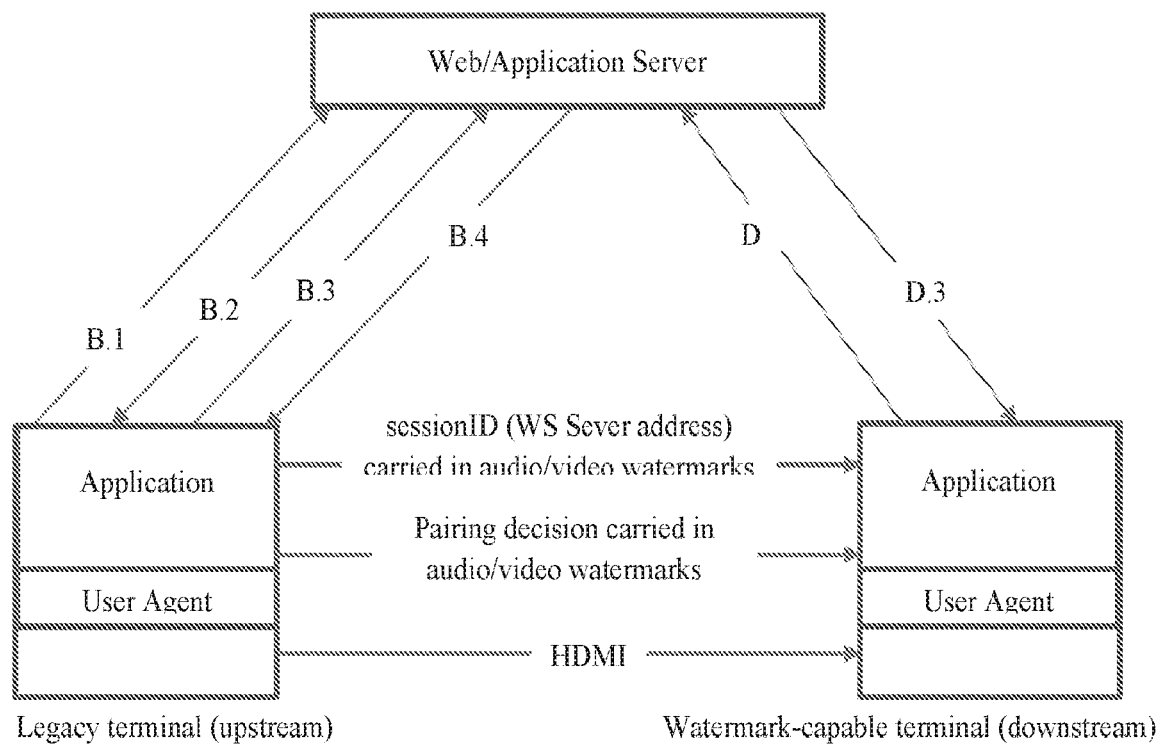
FIG. 1 illustrates a server-mediated device pairing process using a shared session.

This section is intended to provide a summary of certain exemplary embodiments and is not intended to limit the scope of the embodiments that are disclosed in this application.

The disclosed embodiments include techniques for creating a signaling file that contains metadata and signaling data about the broadcast service being presented.

These and other advantages and features of disclosed embodiments, together with the organization and manner of operation thereof, will become apparent from the following detailed description when taken in conjunction with the accompanying drawings.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Introduction

Problem Statement

In regular HbbTV broadcast application signaling, the trigger signal (AIT) always goes to the device that has the HbbTV runtime environment, and it always ends there. In some cases, the trigger ends up in a terminal that doesn't understand HbbTV. In such cases HbbTV doesn't work, but no other harm is done. With the current solution for broadband application discovery, something similar applies. The discovery is always performed by the terminal that receives the digital broadcast. This may be the TV that receives the digital broadcast directly, or the Set Top Box (STB), but never a Terminal (TV) that is downstream from the digital receiver (STB).

With Application Discovery using watermarking, this situation changes. Any device that has access to the (unencrypted) baseband signals may try to discover the HbbTV Service associated with the broadcast. This may be a device (TV) that is downstream from the device that terminates the broadcast, such as the STB. When a TV is connected to an STB, the following situations may occur that may be considered problematic by one or more participants in the value chain: 1) TV discovers, and then launches, an HbbTV service for a broadcast, while the STB also supports HbbTV and may also have launched the HbbTV service. This may result in overlapping calls to action on the screen, which may confuse the user; 2) The HbbTV App can be programmed to automatically show its full user interface. The specification states that this is "usually only used on radio and data services» (that are received on a TV set-a common case with DB services), but the behavior is legal. This could result in two full user interfaces being shown. A user may want to make the interface disappear—with the other one still showing, or a user may start interacting with one of the two user interfaces, which may or may not result in visible feedback, depending on whether the user uses the remote for the STB (the underlying graphics) or the TV {the graphics that are on top); 3) In the above, the broadcast-signaled and broadband-discovered apps may be largely the same, or the broadcaster may have decided that the discovered app has a different look, feel, and/or functionality from the broadcast-signaled one. This is fully legal according to the specs—it's even encouraged for the broadcaster to tailor the app to the discovery mechanism (e.g. because there is no event mechanism in application discovery; knowing about events becomes purely an app functionality, while in broadcast signaling, events are supported "natively" by HbbTV signaling); 4) The TV may show HbbTV functionality on top of a graphical menu that the user interacts with on the STB. This is considered undesirable by TV manufacturers; 5) A completely new element in watermarking-based discovery is that the HbbTV terminal will also attempt to retrieve an app for the recorded program. This is not possible, or at least not done, for broadcast-signaled apps or for app discovery relying on DVB DI metadata. This may result in confusion, but it may also open up new possibilities.

Terminology

Active Application Device means the device on which the application is determined to run according to the pairing protocol.

Active Application Device State is a Boolean value indicating whether the application on a paired device is determined to run or not according to the pairing protocol. If the value is true, the application is determined to run. Otherwise, the application is determined to terminate.

A web session is a sequence of HTTP requests and responses associated to the same web client, application or user.

A session object is a data structure with temporal data stored on a datastore on a remote server.

A session identifier (sessionID) is random number generated by the server that uniquely identifies a web session within the scope of the server (or a cluster of servers).

Device position indicates the position of a device in the paired devices. The device is the upstream device if its value is 'upstream' or the downstream device if the value is 'upstream'.

Pairing token stored as a cookie (or in other web storage) on a device contains the pairing result of the paired device. It consists of Active Application Device State, Device Position of the pairing, and the validity of the token. It may also contain DeviceInfo and associated ServiceInfo.

Upstream device is the first of the two devices connected in series (e.g., via HDMI connection).

Downstream device is the second of the two devices connected in series (e.g., via HDMI connection).

Upstream application is a web application running on a browser on the upstream device.

Downstream application is a web application running on a browser on the downstream device.

DeviceInfo describes the device being paired, may include device identifier, device model identifier, device manufacturer identifier, device operating system and version, device geographic location, browser information and supported APIs, device capability identifier, application platform information (e.g., HbbTV 1.0, HbbTV1.5, HbbTV 2.0, or ATSC 3.0) including whether the device supports audio and/or video watermark detection and HTML5 WebSocket API.

ServiceInfo describes the current service associated the launched application, may include the current service/channel identifiers, country code associated with the service, service types (e.g., linear service, on-demand, or time-shift service), broadcast systems (e.g., ATSC 3.0, DVB, . . . ).

Phase 2 Application Discovery (P2AD): A version of the HbbTV specifications that specifies use of ATSC VP1 watermarks to enable application discovery.

Dual Terminal Scenario: Use case where two HbbTV terminals are connected in series and the downstream terminal is a P2AD Terminal.

Legacy Terminal: An HbbTV terminal that is not a P2AD Terminal.

P2AD Terminal: An HbbTV terminal that implements the P2AD specification.

Upstream Terminal: The terminal in a dual terminal scenario which is the first of the two HbbTV terminals connected in series.

Downstream Terminal: The terminal in a dual terminal scenario which is the second of the two HbbTV terminals connected in series.

Use Cases

There are four scenarios where the devices can be connected in series, as shown in the table below.

TABLE 1

Use Cases of Application Conflict

| Use Case | Upstream Device | Downstream Device |
| --- | --- | --- |
| 1 | Legacy device | Legacy device |
| 2 | Legacy device | Watermark-capable device |
| 3 | Watermark-capable device | Legacy device |
| 4 | Watermark-capable device | Watermark-capable device |

The pairing protocol described in this disclosure is applicable to the use case #2 where the upstream device is a legacy device (e.g., HbbTV 1.0 or HbbTV 1.5) and the downstream is a watermark-capable device. A legacy device is an HbbTV device that does not support watermark detection and signaling recovery protocol including the pairing protocol. A watermark-capable device supports watermark detection and signaling recovery and may also support WebSocket as defined in W3C HTML5 APIs.

The pairing protocol is also applicable to the use case #4, where two watermark-capable devices equipped with HbbTV app2app capability can directly negotiate over a WebSocket connection using app2app protocol specified in HbbTV specifications, or make agreement where the application should run using the pairing server mediated approach.

Communication Between Upstream and Downstream Applications

One-Way Communication from Upstream Application to Downstream Application Via Watermark When upstream and downstream devices are connected in series (e.g., via HDMI connection), at least audiovisual content is passed from the upstream device to the downstream device. A one-way communication channel can be established by embedding watermarks by the upstream application and detecting such watermarks by the downstream application.

Presentations rendered by the upstream application are usually combined with the base audiovisual content received at the upstream device and such combined audiovisual content is provided to the upstream device. For example, Graphic, images or text can be presented by the upstream application as overlay on the base audiovisual content.
audio presented by the upstream application is mixed with the audio in the base audiovisual content
Video can be presented by the upstream application as picture-in-picture on the base audiovisual content.

In one embodiment, watermarks can be embedded by the upstream application in the base audiovisual content without accessing such base audiovisual content. For example, the application creates a graphic or image containing watermarks and overlays it at a specific position on the base video content, an audio content containing watermarks to be mixed with the base audio content.

In another embodiment, watermarks can be embedded by the upstream application in the base audiovisual content by accessing and directly modifying such base audiovisual content. For example, the application may use WebAudio technology provided by HTML5 API to embed audio watermarks by accessing and modifying the base audio content.

Watermarks can be used to carry various types of messages for the one-way communication. Watermarks are also used to identify the downstream device: if an application on a device detects watermarks carrying a predefined type of message, this device is identified as the downstream device. For example, if an application on a device detects watermarks carrying a sessionID, the device is identified as the upstream device in the pairing process.

Session ID

As discussed below, upstream and downstream applications can communicate with each other using web session, mediated by the server.

In order for two applications on two devices to have access to the session information of a session on a server, a single session ID that uniquely identifies the session must be available to both applications.

The session ID is embedded as watermarks by the upstream application in the audio and/or video content and detected by the downstream application.

WebSocket Server Address

Watermarks carrying WebSocket (WS) server address(es) can be embedded into audio and/or video content by the upstream application and detected by the downstream application if WebSocket server is available to the application.

Once the downstream application recovers the WebSocket server address, it can establish a direct two-way communication channel with the upstream application to negotiate the Active Application Device.

The Websocket server address can be a full or partial URL that indicates the Websocket server IP address on the upstream device. Note that if a partial WebSocket server address is used, the application has knowledge to construct the full Websocket server address and use it to establish a WebSocket connection with the upstream device.

Active Application Device State

If a decision is made by the upstream application as described in the section "Decision made by upstream device" below, such decision can be sent to the downstream application using watermarks.

Server-mediated communication between applications using shared session.

Session Management

Two application instances on two different devices can access the same session object identified using the shared session ID for pairing.

Session ID is generated by a web server and can be stored on the user agent as cookies or in other web storage. A session object contains a session ID, its expiration, and associated device information and the current service information being paired.

The general idea is to use a server-generated session ID shared by two devices for communication between two devices. The session ID is passed from the application instance on the upstream device to the application on the downstream device using watermarks.

Session Object

TABLE 2

Session Object

| Field | Description |
| --- | --- |
| sessionID | |
| Validity | This field is present only if the WebSocket Server is available for the application on the device |
| Pairing Status | If the field value is true, the devices are paired. Otherwise, the devices are unpaired. |
| Upstream Device | |
| DeviceInfo | |
| ServiceInfo | |
| Active Application Device State | The upstream device is the Active Application Device if the field value is true. |
| Downstream Device | |
| DeviceInfo | |
| ServiceInfo | |
| Active Application Device State | The upstream device is the Active Application Device if the field value is true. |

For example, a session object can be represented as in a data structure with key-value pairs:

```
820947860983: {
    Validity: 2020-11-05T08:15:30-05:00,
    Paring Status: true
    Upstream {
        HbbTV_version: 1.5,
        Active Application Device
    State: true
    }
    Downstream {
        HbbTV_version: 1.5,
        Active Application Device
    State: false
    }
```

The session object is like a data locker for web application instances or users, and the key for the locker is the session ID. Server only allows the request with a session ID to access to the data locker corresponding to the session ID.

If the applications connect to multiple web servers, knowledge of session state (as is typical in a cluster environment) session information must be shared between the cluster nodes that are running web server software. Methods and systems for sharing session state between nodes in a cluster are widely known and available.

Direct Communications Between Upstream and Downstream Applications Using WebSocket When there are direct communications between upstream and downstream applications using protocols such as Websocket or WebRTC, the protocol should be applied after exhausting attempts to establish direct communications between the application instances on more than one HbbTV devices. For example, if the browser on which a HbbTV application is launched on a legacy device supports WebSocket/WebRTC, the application may attempt to establish a WebSocket/WebRTC connection with another device with a WebSocket/WebRTC server according to a known discovery protocol if the Websocket server is not known to an application, or to attempt to establish such connection by scanning all possible IP addresses and ports within the home network if there is known discovery protocol.

Session ID in this case is generated locally by the application for each associated service/channel. For example, it can be a large random number stored as cookie for each Websocket request and response. A session object contains a session ID, its expiration, and associated device information and the current service information being paired.

Active Application Device Determination

Once two devices are paired, the decision on which is the Active Application Device can be made in several approaches as described below.

Decision Made by Upstream Device

Once two devices are paired, the application currently running the upstream device takes leadership to determine which one of the paired devices is Active Application Device.

If the upstream device is determined as Active Application Device, the application on the upstream device embeds an event message containing Active Application Device State value 'false' for the downstream device, and returns true (i.e., the upstream device is the Active Application Device.

Otherwise, the application on the upstream device embeds an event message containing Active Application Device State value 'true' for the downstream device, and return false (i.e., the upstream device is not the Active Application Device).

The event message may be embedded in a single video frame, an interval of audio samples, or continuously in a period of audio and/or video content.

Decision Made by Pairing Server

Once two devices are paired on a server using session management, the server may determine which of the paired device is the Active Application Device based on the predefined rules using the DeviceInfo and ServiceInfo about the device and service involved in the pairing process.

If the upstream device is determined to be the Active Application Device, the server sets the Active Application Device State to true for the upstream device and false for the downstream device in the session object stored on the server, respectively. Otherwise, the server sets the Active Application Device State to false for the upstream device and true for the downstream device in the session object stored on the server, respectively. An event message containing Active Application Device State value 'false' for the downstream device, and returns true (i.e., the upstream device is the Active Application Device).

After the Active Application Device is determined, the Active Application Device State value associated with the requesting device is included in the response to each HTTP request from both upstream and downstream devices.

Decision Made by the User of the Upstream and Downstream Devices

Once two devices are paired, the applications on both upstream and downstream devices can prompt the user to make decision which device is Active Application Device.

The application on the upstream device or downstream device can present a user interface that allows the user to make decision. For example, two choices are presented to the user for selection: click here to select the upstream device (i.e., the set-top box) on which the interactive application will run, or click here to select the downstream device (e.g., the TV) on which the interactive application will run. The application sets the Active Application State for the upstream device to true if the user selects the first choice, or sets the Active Application State for the upstream device to true if the user selects the second choice.

Decision Made by Negotiation Between Upstream and Downstream Devices

Once two devices are paired using WebSocket communication between applications on paired devices (e.g., application2application protocols specified in HbbTV and ATSC 3.0), the applications can directly negotiate which device is Active Application Device.

Pairing Token

A pairing token contains the result of a paired device. It can be stored as a cookie (or in other web storage) on a device.

A pairing token contains at least the following information:

DevicePosition, which indicates whether the device is a downstream or upstream device.

Validity (e.g., until a specific date and time, permanent until the application determines to initiate a new pairing process, valid until the Active Application Device State is updated by the application.

Active Application Device State is a flag indicating whether the application associated with a service/channel on the device shall run or not.

A pairing token may also contain DeviceInfo, ServiceInfo, date and time when two devices were paired, and she session ID used for the pairing.

A web application is sandboxed according to its web origin. Thus, a pairing token is created for all applications on a device with the same web origin. In addition, the pairing token can contain a service/channel identifier as described in ServiceInfo which allows a different pairing token to be created for each service/channel associated with one or more applications that share the same web origin (e.g., a single application is provided for multiple services of a broadcaster, or a broadcaster offers multiple applications that have the same web origin).

For example, if a broadcast station has 3 channels and a single application is developed for all these channels (or three different applications for the channels share the same web origin), the pairing protocol can be applied to each of the channels, resulting in a different pairing token for each channel. Different pairing token for each channel allows the station to set different pairing preference for different channel. For example, the upstream device may be a legacy device and the downstream device may be a watermark-capable device in paired devices. The station may prefer to select upstream device as Active Application Device for channel #1, and downstream device as Active Application Device for channel #2 because the application associated with the channel #2 requires advanced capabilities that are available only on the watermark-capable device.

Device Pairing Protocols

Direct Negotiation between upstream and downstream applications using WebSocket

This pairing protocol is applicable to the use case where both upstream and downstream devices are watermark capable, and WebSocket is available to both upstream and downstream applications. For further details, see the Section "Dual Terminal Scenario Analysis" below.

Active Application Device Determined by Upstream Application

This pairing protocol is applicable to the use case where:
Both upstream and downstream devices are watermark capable, or the upstream device is a legacy device and the downstream device is watermark capable;
Active Application Device decision is made by the upstream application; and
WebSocket may or may not able to both upstream and downstream applications.

This pairing protocol uses watermarks to deliver the Active Application Device decision made by the upstream application to the downstream application. For further details, see the Section "Dual Terminal Scenario Analysis" below.

Server-Mediated Device Pairing Protocol

This pairing protocol is applicable to the use case where:
Both upstream and downstream devices are watermark capable, or the upstream device is a legacy device and the downstream device is watermark capable;
Active Application Device decision is made by the upstream application, server, users, or both upstream and downstream applications; and
WebSocket is not available to both upstream and downstream applications.

Pairing Process for Application on Legacy Device

FIG. 1 shows the pairing process for a legacy device.

Apply the following pairing protocol on a legacy device, once an application is launched on such device. Set the devicePosition to "upstream". Note that the legacy device is always the upstream device in the pairing process.

A. If a valid pairing token is present on the device and Active Application Device State is true in the token, the application continues to provide interactive content without delay.

B. Otherwise, the application suspends its activities (e.g., by suppressing the graphics overlaps and other interactive features) for a predefined timeout (e.g., a period of 3 seconds counting from the current time) and performs the following steps 1-3 until a pairing is successful (i.e., the pairing status is true).

1. If a valid sessionID is available, go to step 3. Otherwise, make a HTTP(S) request to an application server capable of session management. The request can be made either to access application resources for interactivity or a specific web page dedicated for pairing on an application web server. The request may contain deviceInfo and ServiceInfo. This step is shown as B.1 in FIG. 1.

2. Once the application on the device receives the response containing a sessionID (and validity) from the server, it embeds continuously or periodically an event message into audio and/or video watermarks which contains the sessionID and WebSocket server address (if such WebSocket server is supported by the device). This type of event message is defined by application developers for device pairing purpose. A new sessionID may be provided by the server when the present sessionID is no longer valid. This step is shown as B.2 in FIG. 1.

3. Once the sessionID is available, it is included as a cookie or part of the URL in all subsequent HTTP(s) requests made by the application to the application server for the purpose to access interactive content or periodical polling the server for pairing status (e.g., by visiting specific web page dedicated for pairing). This step may consist of more than one HTTP(S) request and can be performed simultaneously with the previous step as long as the devices are not paired during the entire life cycle of the applications. This step is shown as B.3 in FIG. 1.

4. If pairing status returned from the server is true (i.e., paired) by the timeout and perform an "Active Application Device Determination" function as described in section [0095].

a. If the function returns true (i.e. the device is the Active Application Device), the application continues to run on the device and updates the pairing token associated with the service/channel by setting devicePosition to 'upstream', Active Application Device State to true and Validity of the token according to the return value of the "Active Application Device Determination" function.

b. Otherwise (i.e. the device is not the Active Application Device), the application terminates and on the device and updates the pairing token associated with the service/channel by setting devicePosition to 'upstream', Active Application Device State to false and Validity of the token according to the return value of the "Active Application Device Determination" function.

5. If none of the above conditions is met within the timeout, the application continues to run without pairing attempt for the current service. Alternatively, the application may go back to the step B immediately or wait for N seconds to start the pairing again.

Pairing Process for Application on Watermark-Capable Device

If the device is a watermark-capable and the application is launched through watermark-capable signaling recovery process, apply the following pairing protocol. Note that a watermark-capable device can be either an upstream or downstream device.

Figure 2:
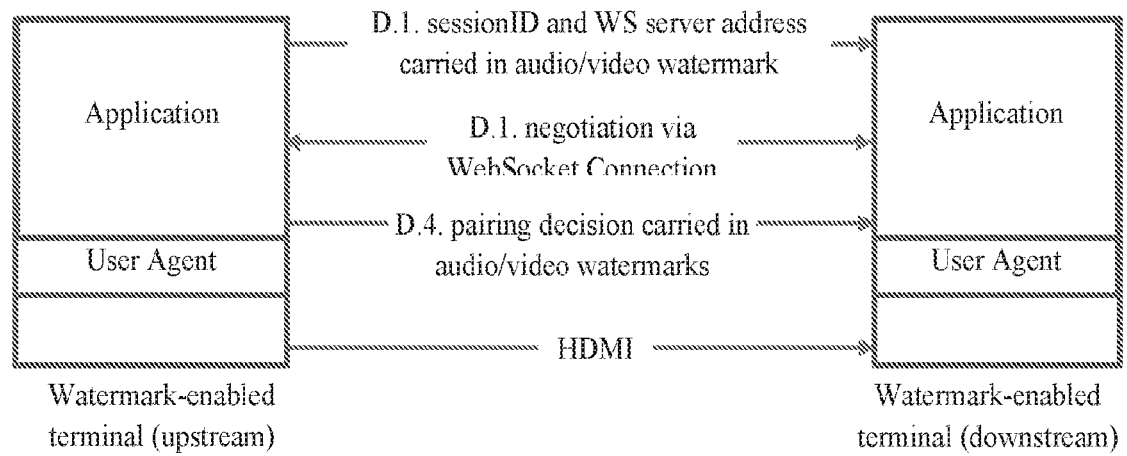
FIG. 2 illustrates device pairing by application using direct Websocket communication.

As shown in FIG. 2, in the step D.1: 1) sessionID and WS server address are sent by the upstream application to the downstream application via watermarks as described in the step D. 1; and 2) A two-way communication is established between upstream and downstream applications for negotiation on Active Application Device. In step D.4, if the upstream application determines Active Application Device, such decision can be sent to the downstream application via watermarks.

C. If a valid pairing token is present on the device and Active Application Device State is true in the pairing token, the application continues to provide interactive content without delay.

D. Otherwise, the application suspends its activities (e.g., by suppressing the graphics overlaps and other interactive features) for a predefined timeout (e.g., a period of 3 seconds counting from the current time), and 1) set the devicePosition to "upstream" by default; 2) generate a sessionID for WebSocket communication if no valid sessionID is present; 3) continuously (or periodically) embed the sessionID and WebSocket server address into watermarks, and continuously performs watermark detection until one of the following conditions occurs.

1. If an event message containing a sessionID without WS server address is detected in the watermarks within a predefined interval (e.g., 1.5 seconds after the start of the pairing process), the application sets the devicePosition to "downstream" and performs the B.3 steps. Note that the use case #2 shown in Table 1 is identified.

2. If pairing status returned from the server is true (i.e., paired) by the timeout, perform B.4 step. Note that when this event occurs, it was a result of performing the B.1 step for the use case #2 in Table 1.

3. If an event message containing a sessionID and WebSocket server address is detected in the watermarks within a predefined interval (e.g., 1.5 seconds after the start of the pairing process), the application sets the devicePosition to "downstream" and use the WebSocket server address to establish a direct communication channel with the upstream application to negotiate which device is the Active Application Device as described in section [0107] to complete the pairing process. Note that the use case #4 shown in Table 1 is identified.

4. If an event message containing an Active Application Device State is detected in the watermarks within a predefined interval (e.g., 1.5 seconds after the start of the pairing process), the application sets the devicePosition to "downstream" and performs the following steps:

a. If the value of the Active Application Device State true (i.e. the device is the Active Application Device), the application continues to run on the device and updates the pairing token associated with the service/channel by setting devicePosition to 'upstream', Active Application Device State to true and Validity of the token according to the return value of the "Active Application Device Determination" function.

b. Otherwise (i.e., the device is not the Active Application Device), the application terminates and on the device and updates the pairing token associated with the service/channel by setting devicePosition to 'upstream', Active Application Device State to false and Validity of the token according to the return value of the "Active Application Device Determination" function.

5. If none of the above conditions is met within the timeout, the application continues to run without pairing attempt for the current service. Alternatively, the application may go back to the step D immediately or wait for N seconds to start the pairing again.

Pairing Process at Server

E. When the server receives the request from a device, if the request contains a valid sessionID (i.e., the sessionID is present in server's session datastore and the sessionID has not expired), F. Otherwise, the server generates a pseudo-random number as the sessionID and creates a session object. Note that 1) the uniqueness of the sessionID is guaranteed within the scope of the server (or a cluster of servers) for applications associated with one or more broadcast services; 2) the server determines the validity for each sessionID and is responsible for removal of any expired sessionID from the database.

1. The server stores the session object in a datastore on the server.

2. The server sends a response containing the session object to the application.

Examples of Pairing Process

Figure 3:
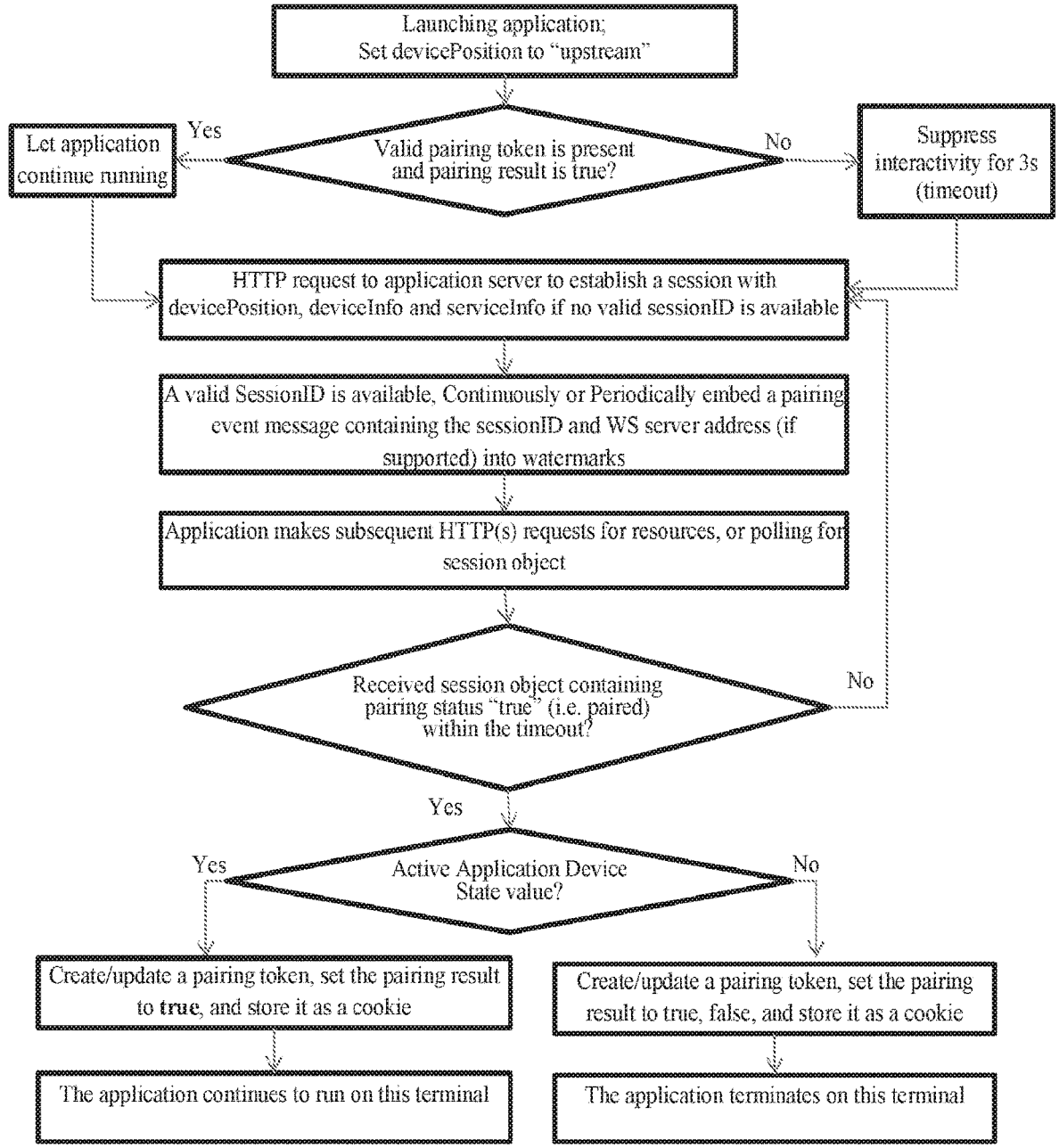
FIG. 3 illustrates a pairing process for legacy deices.
Figure 4:
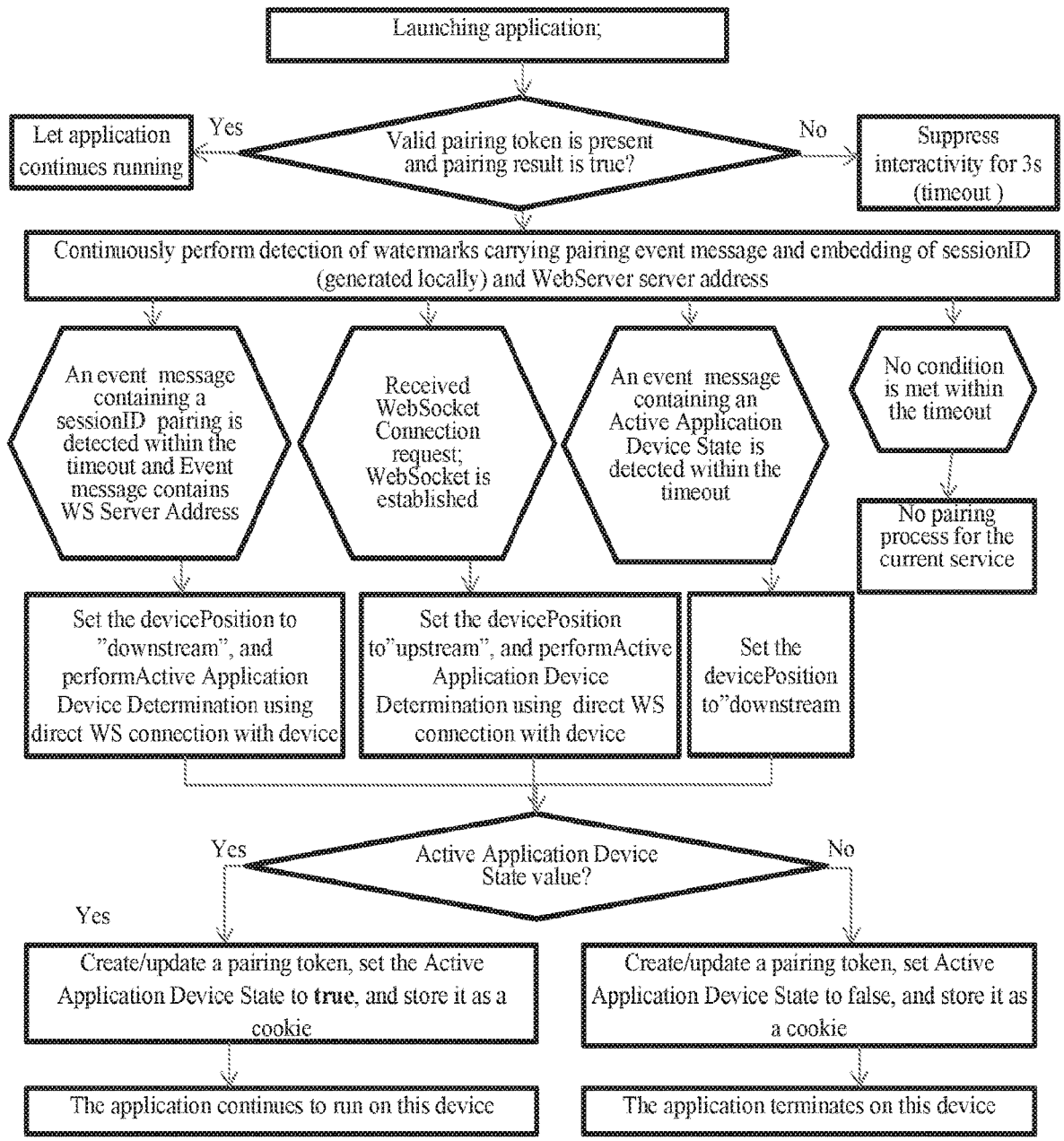
FIG. 4 illustrates a pairing process for a watermark-capable terminal.
Figure 5:
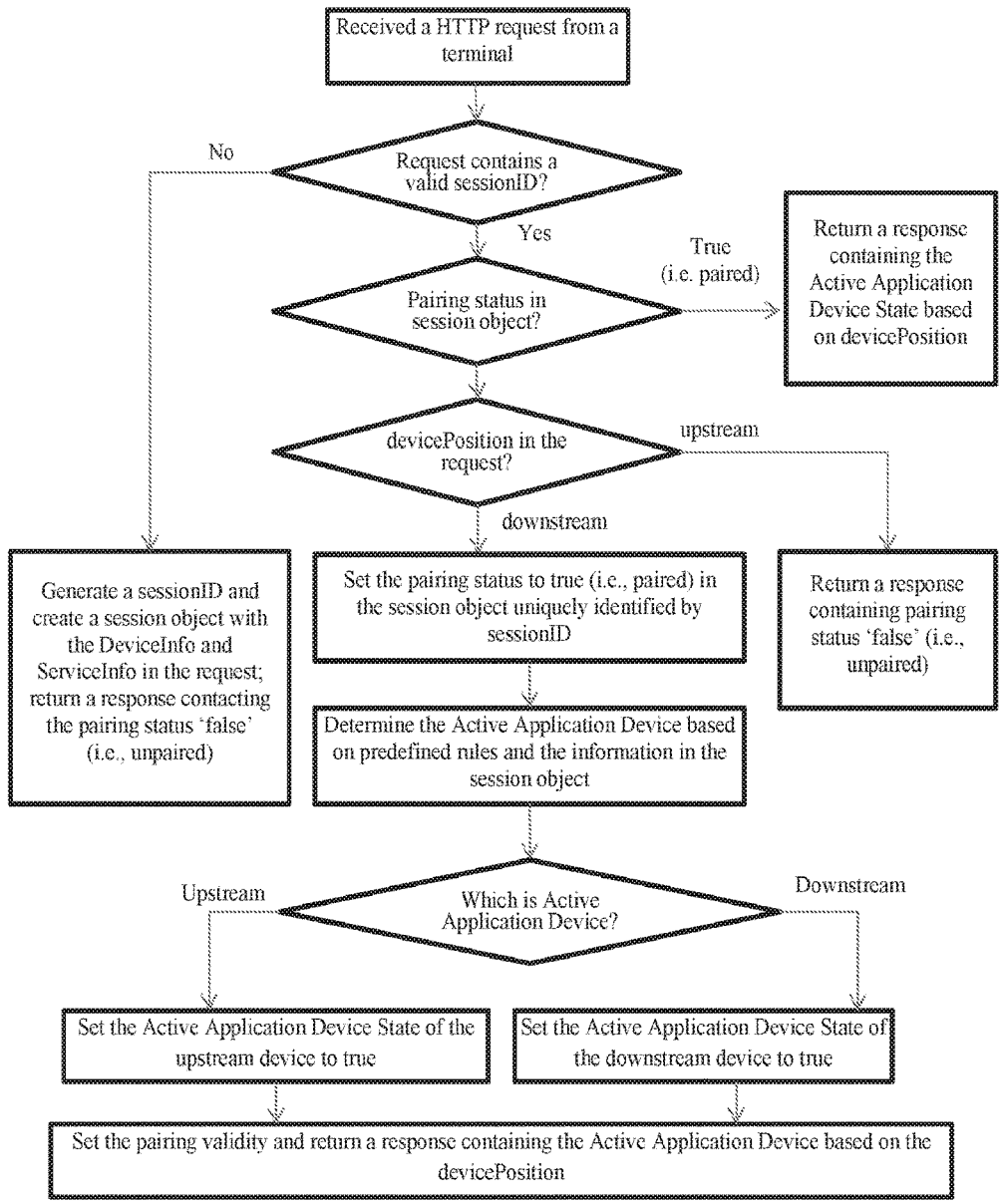
FIG. 5 illustrates a process for a pairing server.

FIGS. 3-5 show the exemplary pairing process for legacy device, watermark-capable device, and pairing sever (if involved).

Session Hijacking

The Session Hijacking attack compromises the session ID by stealing or predicting a valid session token to gain unauthorized access to the Web Server using the common attack methods such as predictable session ID; session sniffing, client-side attacks (XSS, malicious JavaScript Codes, Trojans, etc.), and man-in-the-middle attack.

The sessionID is only valid during a session for pairing which typically lasts for a few seconds. A large and unique random number generated by the sever using a secure hash function such as SHA-128 or -256 can make sessionID less predictable. HTTPs can be used for client-server communication during the pairing process to mitigate these common attacks. In addition, to prevent unauthorized device from accessing the sessionID by performing watermark detection from the content originated from the downstream device, the watermarks carrying the dynamic event containing the sessionID can be removed or overwritten by the watermark detector or Web application on the downstream device after the sessionID has been detected.

Re-Initiation of Pairing Process

A new pairing process may be initiated in the following cases:

- Pairing token expires. Expiration terms can be specified by the date and time (e.g., the token expires until a UTC time), the number of times that can be used for launching applications (e.g., a token associated with a service/channel on a device is expired after it has been used N times to skip the pairing process where N ranges from 0 to an indefinite number).
- Application initiates the pairing process. For example, when the application detects a change of the device capabilities (using the APIs provided by the device), it may initiate the pairing process regardless of expiration terms of the pairing token associated with a service/channel.
- The user may initiate the pairing process using a function provided by the device or the application associated with a service/channel. For example, such function may be provided in form of device configuration or in application function menu.

De-Duplication of Usage Data

There are several approaches to ensure accurate viewership/usage data is reported. In other words, only the usage data collected on the Active Application Device should be reported. Note that usage data can be collected and/or reported to a usage data server by the application and/or device functions on the Active Application Device.

- If usage reporting is a native function of a paired device, application on such device can notify the device of the pairing decision. If the device is not the Active Application Device, the usage reporting function on the device should not collect and/or report the usage data. A notification API may be needed.
- Once the decision is made that the upstream device is the Active Application Device, the upstream application removes and/or overwrites all watermarks embedded in content for signaling recovery. Thus, no usage data for the service will be reported on the downstream device, which provides indication that the usage data is duplicated and comes from a non-Active Application Device.
- Usage data collected by application and/or a native device function contains the information about the pairing result, which is used for duplication on usage data collection server and during usage data processing. For example, a field is added in the usage data to indicate such usage data is collected on an active Application Device or a non-Active Application Device.

For background information, see:

1. HbbTV Specifications: HbbTV 1.0 (attached hereto as Appendix C), HbbTV 1.5 (available at https://www.hbbtv.org/resource-library/#specifications, which is incorporated herein by reference), and HbbTV 2.0.1 (available at https://www.hbbtv.org/resource-library/#specifications, which is incorporated herein by reference).
2. ATSC Specification A/344 (available at https://www.atsc.org/standards/atsc-3-0-standards/, which is incorporated herein by reference); see also US patent application US 2015/0264429, which is incorporated herein by reference.
3. W3C Specification WebSocket APIs (available at https://www.w3.org/TR/2011/CR-websockets-20111208/, which is incorporated herein by reference), W3C Specification WebRTC (available at https://www.w3.org/TR/webrtc/, which is incorporated herein by reference), HTTP (Web Origin, cookie, (available at https://www.w3.org/Protocols/, which is incorporated herein by reference.)

Dual Terminal Scenario Analysis

This analysis defines a means to avoid conflict between HbbTV applications running on both terminals in a dual terminal scenario.

Candidate Solutions

The following solutions may be used alone or in combination.

Network Signaling

The Network Signaling ("NS") solution employs network communication between the applications running on the upstream and downstream terminal to identify and respond to the dual-terminal scenario.

This solution has the following functional requirements:

Req. NS1. Applications shall be able to communicate over a network.

Req. NS2. Applications shall establish that they are connected in a dual terminal scenario.

Req. NS3. Applications may establish their position (upstream or downstream) in the series connection.

Req. NS4. Applications shall resolve any conflicts.

Req. NS1 is expected to be met in any P2AD environment because the P2AD function itself requires access to a broadband server for DNS resolution, AIT recovery, application acquisition, etc. Since both terminals must be able to reach a WAN server for these functions, by definition there is a network path between the two terminals in the dual terminal scenario. It is also possible that other network paths will exist between the two terminals; e.g. the two terminals may be able to connect over a LAN.

Req. NS2 is non-trivial to fulfill. Issues to address include:

- A household may contain multiple terminals, some of which are in dual terminal configuration and others which are not. For example, there may be a dual terminal configuration and both a P2AD and a legacy terminal not in dual terminal configuration, and all may be tuned to the same service.
- Unique device identifiers that are persistent and accessible across services have been introduced in HbbTV v2.0.1 but do not exist in prior specification versions.

Possible means of fulfilling Req. NS2 and Req. NS3 are described below.

Device Pairing

User performs a configuration step wherein the devices are "paired" through the establishment of a data record identifying the devices and their connection relationship. This data record is accessed by applications running on one or both devices to identify the presence of the dual terminal condition and coordinate the application behavior on the two terminals to avoid conflict. The pairing step may involve an action performed on both devices, similar to Bluetooth or YouTube device pairing. The pairing may be established in a peer-to-peer fashion (directly negotiated between the two terminals) or may be established with the assistance of an intermediary; e.g. with each terminal communicating with one or more network servers, or a combination of the two. For purposes of pairing, the terminals can be identified either using the HbbTV unique device identifiers or third-party cookies (in which case the pairing can be maintained across services) or alternately using first-party cookies or the local (web) storage API (in which case the pairing may only be maintained within a service). Ideally, a pairing will persist across application sessions, but pairings may be transient (e.g. within a session).

An example of how device pairing might be accomplished among devices that support terminal discovery and application-to-application communication (e.g. HbbTV 2.0 and later) is as follows:

1. Application is delivered to an STB or TV.
2. Application auto-runs.
3. Application establishes a persistent, unique identity for the terminal on which it is executing.
4. Application uses the terminal discovery service to discover other HbbTV terminals on the local network.
5. Application uses application-to-application service to exchange identities, selected service identifier, and current service time with each terminal running an application that employs the same pairing protocol and identifies those that are currently playing the same service at the same time on the service timeline ("pairing candidates"). If no pairing candidates exist, the application records that it is unpaired and halt the pairing procedure.
6. Applications each generate a unique pairing code and display it on the screen with a message directing the user to enter the pairing code into a terminal connected to the screen on which the pairing code is displayed. The message should also notify the user that they may need to enter more than one pairing code to complete the pairing. The message should also provide the user of a way to dismiss the pairing request. The pairing code is displayed with an opaque background so as to ensure that if it is a downstream device in a dual terminal configuration, a pairing code displayed by the upstream device will be obscured by the pairing code displayed by the downstream device and not visible to the user.
7. If an application receives as user input the pairing code which it is displaying, it removes from the screen its pairing code prompt (to ensure that if it is a downstream device in a dual terminal configuration, the pairing code displayed by the upstream device will no longer be obscured). The application should transmit a message to its pairing candidates indicating that the terminal on which it is running is unpaired.
8. If an application receives a message from another pairing candidate that the terminal on which it is running is unpaired, it should delete any pairing record that it has stored for the sending terminal.
9. If an application receives as user input a different pairing code from the one it is displaying, it transmits a pairing notification message to its pairing candidates conveying: (a) the pairing code which it has received as user input; and (b) whether or not it is continuing to display its pairing code.
10. If application receives a pairing notification message indicating that the sending application has received as user input the pairing code that the receiving application is displaying, this indicates that the sending and receiving applications are running on terminals connected in the dual terminal configuration and the two devices should be paired. If the pairing notification message indicates that the sending application is continuing to display its pairing code, then the receiving application is running on the downstream terminal and the sending application is running on the upstream terminal. Otherwise, the receiving application is running on the upstream terminal and the sending application is running on the downstream terminal. The receiving application records this pairing and transmits a pairing confirmation message identifying the two devices which have been paired (via the sending and receiving device identifiers) to its pairing candidates. If the receiving application is displaying its pairing code, it should stop displaying its pairing code and end the pairing procedure.
11. If an application receives a pairing confirmation message including its own device identifier, it should stop displaying its pairing code and end the pairing procedure.

An example of how device pairing might be accomplished among devices that do not support terminal discovery (e.g. HbbTV 1.0 and 1.5) is similar to above, but communication between devices must be brokered by a central server. Devices can't discover each other, so either central server needs to identify pairing candidates within a household or user needs to initiate pairing on the devices.

Once pairing is established, applications running on paired devices can negotiate to resolve conflicts, which may be fully automated or may include requests for user input to direct the resolution.

In-Band Signaling

The In-Band Signaling ("IS") solution to the dual terminal scenario uses modifications to the audio or video introduced by an application running on an upstream terminal to transmit a message that can be received by a downstream terminal (either at the device level or in the running application). The message provides a means for the application on the upstream terminal to make the downstream terminal (or the application running on it) aware of modifications that it is making to the presentation, enabling the downstream terminal to avoid making conflicting modifications.

IS may be performed using one or more of the techniques described below.

Video Watermark Insertion

The application running on an upstream terminal can insert a video watermark message using the ATSC-defined technology by placing a graphic overlay on the top two lines of video. Such graphic overlays are supported in all HbbTV specification versions, so should be supported in any upstream terminal. With this approach, downstream terminals would be required to support video watermark detection.

The message could be the display_override_message as defined by ATSC, which directs the downstream device to direct applications to suppress any modifications to the received audio and video for up to 15 seconds. The message would need to be periodically sent every 15 seconds during time periods when audio or video modifications made by the application on the downstream terminal could conflict with those of the application on the upstream terminal.

Alternately, the video watermark message could convey a dynamic_event_message carrying a pairing token that uniquely identifies the application instance running on the upstream terminal. This token can be used by both terminals, in combination with NS, to pair the two terminals. An example pairing process is as follows:

1. Application is delivered to STB or TV.
2. Application auto-runs in unpaired state.
3. Application generates a unique pairing token and provides it to a network service (e.g. broadband server hosted by the application developer) or alternately obtains a unique token from the network service.
4. Application subscribes to dynamic event stream associated with detection of a pairing token in a video watermark.
5. The application periodically embeds the dynamic_event_message conveying the pairing token in the video output of the terminal via video watermark message.
6. If the application receives a dynamic event associated with detection of a pairing token in a video watermark, the application notifies the network service to establish, via the network service, a pairing connection to the associated terminal.
7. If the application receives notification from the network service that another device has received its pairing token, the application establishes a pairing connection to the associated terminal via the network service.

Once pairing is established, applications running on paired devices can negotiate to resolve conflicts, which may be fully automated or may include requests for user input to direct the resolution.

Note that the insertion of a video watermark message by the upstream terminal may overwrite pre-existing video watermark messages in the video content. For this reason, the insertion should be periodic and very brief (e.g. as short as a single frame). Because terminals in a dual terminal scenario are directly connected by high-quality video connections, very brief video watermark messages may be embedded at very low luminance levels and can be reliably detected.

Audio Watermark Insertion

Audio watermark modification, LSB encoding, audio replacement, DTMF or similar techniques could be used. HbbTV 2.0 supports WebAudio which can be used for insertion. Different means of insertion for v1.0 or v1.5 are needed.

User Device Configuration

P2AD terminals may provide a built-in user configuration setting whereby the P2AD function may be activated or deactivated:

Globally
Individually for each input source (e.g. HDMI1, HDMI2, etc.)
Individually for each service (e.g. BBC1, BBC2, etc.)
Technique without WAN Pairing Server With this approach, if the upstream device is a legacy device, it always gets the interactivity. Broadcaster decides on a "leadership position" (either upstream or downstream) for the application which is the terminal position where interactivity is immediately initiated in advance of the initial pairing attempt when dual 2.0.1 terminals are connected in series.

If application is running on a v1.0/1.5 terminal:
Periodically (e.g. once per second), briefly (e.g. for 1 frame) overlay a dynamic event video watermark message notifying any downstream application of the presence of the application running on an upstream v1.0/1.5 terminal ('notifying event');
Provide interactivity on this terminal.
If application is running on a version 2.0.1 terminal:
On launch:
if no pairing configuration cookie exists; or
if pairing configuration #1 cookie exists; or
if pairing configuration #2 cookie exists; and leadership position is upstream or;
if pairing configuration #3 cookie exists and leadership position is downstream:
Suppress interactivity for a brief period of time (e.g. three seconds) after launching in order to enable notification/pairing to occur.
Clear pairing configuration cookie.
Subscribe to notifying events and pairing events from video watermark messages.
Subsequently:
Periodically (e.g. once per second), briefly (e.g. for 1 frame) overlay a dynamic event video watermark message notifying any downstream application of the presence of an application running on an upstream terminal, the enumeration ID of the terminal, and a randomly generated session ID ('pairing event').
If a notifying event is received from an upstream terminal, extend time to suppress interactivity and record pairing configuration #1 (i.e. this terminal is downstream from a v1.0/1.5 terminal) in a cookie.
If a pairing event is received from an upstream terminal, initiate app2app communication to the upstream terminal from the event and provide the session ID from the event, negotiate with the upstream terminal to establish which terminal will run interactivity, and record pairing configuration #2 (i.e. this terminal is downstream from a v2.0.1 terminal) in a cookie.
If incoming app2app communication is received from a downstream terminal and the randomly generated session ID is provided, negotiate with the downstream terminal to establish which terminal will run interactivity and record pairing configuration #3 (i.e. this terminal is upstream from a v2.0.1 terminal) in a cookie.

Verifier-Based Signaling File Generation

Introduction

Other embodiments relate to media devices implementing new television standards, such as ATSC 3.0, which includes audio/video essence and metadata/signaling. These embodiments include techniques for creating a signaling file that contains metadata and signaling data about the broadcast service being presented. The signaling file may include URLs that can be used to access signaling information for supplementary signaling and content. The signaling also contains a mapping between a first timing system and a second timing system. The first timing system may comprise the watermark timeline represented in intervals and the second timing system may comprise a DASH presentation time.

This embodiment is related to U.S. patent application US20160057317A1, which is incorporated herein by reference. This section describes a method to populate signaling files for redistribution scenarios based on the metadata extracted from the Advanced Television Systems Committee (ATSC) content comprising audio/video essence as well as metadata/signaling and a mapping between the first timing information extracted from watermarks and the second timing information carried in the ATSC content. For further details about ATSC, including ATSC 3.0 see patent application US20150264429, which is incorporated herein by reference.

A signaling file contains metadata and signaling data about the broadcast service being presented including URLs that can be used to access signaling information for supplementary signaling and content. Signaling files are delivered to the receiver by a recovery server via broadband in the redistribution scenarios.

The first timing information is represented as an interval code that identifies the interval of content in which the watermark payload value is embedded. The watermark payload includes at least the following other fields 1) a server code field that identifies a server which acts as the starting point for acquisition of supplementary content, 2) a query flag field—when its value changes, it announces an event or indicates the availability of a new signaling file.

Signaling File Generation

Figure 6:
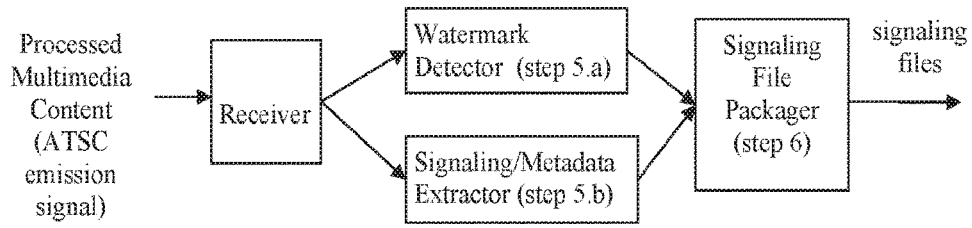
FIG. 6 illustrates a signaling file generator.

U.S. patent application US20160057317A1, incorporated herein by reference, and FIGS. 4 and 6 therein particularly, provides useful background in understanding the present embodiments. With reference to FIG. 6, the following steps may be employed in one embodiment of the present disclosure:

Receive a multimedia content including audio and video components.

Embed watermarks into one or both of the audio or the video component, embedded watermarks including a first timing information.
  a. The first timing information is the interval codes embedded in the audio and/or video content Process the embedded content for transmission (including packaging the embedded content with metadata into ATSC emission).
  a. The processed multimedia content is ATSC broadcast content.
  b. The processed multimedia content comprising a metadata stream or metadata section that includes the second timing information for content samples in a second timing system (e.g., the Dynamic Adaptive Streaming over HTTP (DASH) timeline). The second timing information is specified by at least two types of the metadata carried in the metadata stream or sections: 1) timing information in DASH Media Presentation Description (MPD) including period start time that specifies the start time of a period and MPD availability start time that is the anchor for the MPD in wall-clock time in Coordinated Universal Time (UTC) for live streaming; 2) the presentation (or composition) time of the content sample being rendered which is specified as an offset from the period start time and defined in codecs such as Moving Pictures Experts Group Part 2 (MPEG-2) and International Organization for Standards Base Media File Format (ISOBMFF).

Obtain, at a receiver device, a first version of the processed multimedia content through a communication channel such as over-the-air broadcast, broadband connection, physical connector, or shared file system.
  a. The first version of the processed multimedia content contains the metadata stream or metadata sections that include the second timing information.

Perform decoding and rendering of the received first version of processed multimedia content, and simultaneously perform the following steps during decoding and rendering of the received first version of processed multimedia content:
  a. Watermark detection operations on the first version of the processed multimedia content to obtain the first timing information; the first timing information comprising an interval code that is associated with a content sample (a video frame and/or audio frame/sample) currently being rendered, and
  b. Extraction of metadata from the metadata stream or sections in the received first version of processed multimedia content; the metadata includes a second timing information that is associated with a content sample (a video frame and/or audio frame/sample) currently being rendered.

Once an interval code is extracted in the step 5, immediately create a signaling file that may contain the following information and make the signaling file available to receivers for content signaling in redistribution scenarios:
  a. A mapping between the first timing system and the second timing system. A mapping is a vector consisting of two elements and the first element represents a timing information (t1) in the first timing system and the second element represents a timing information (t2) in the second timing system; the different values of both elements are associated with the same content sample being rendered. For example, assume that t1 is an interval code value 1000 and t2 is a UTC time 2016-11-05T08:15:30-05:00. The mapping (t1,t2) indicates that the starting content sample of the content segment from which the interval code 1000 is extracted is associated with a presentation time value at Nov. 5, 2016, 8:15:30 am, US Eastern Standard Time on DASH timeline.
  b. A description of the media component embedded with a watermark containing the payload containing server-Code and intervalCode.
  c. Content identifier for the segment associated with the extracted service code and interval code.
  d. Service information of the content segment associated with the extracted service code and interval code including service identifiers.
  e. Service signaling including the URLs used by the receiver to report usage data and DASH MPD.
  f. Application signaling including URLs for downloading, launching and management of broadcast applications.
  g. Dynamic events associated with the content segment from which the service code and interval code are extracted.

As shown in FIG. 6, the signaling file generator receives the processed multimedia content and produces signaling files. It can be placed at one or more of the following points in broadcasting chain:
  1. TV station production stage prior to direct transmission to consumers;
  2. TV station production stage prior to transmission to network operators such as Multichannel Video Programming Distributors (MVPDs);
  3. Viewing stage at consumer receiver.

Mapping Between DASH Timeline and Watermark Timeline

This section describes in detail the mappings between the watermark timeline represented in interval codes and the DASH presentation time used in ATSC 3.0 for media presentation.

Figure 7:
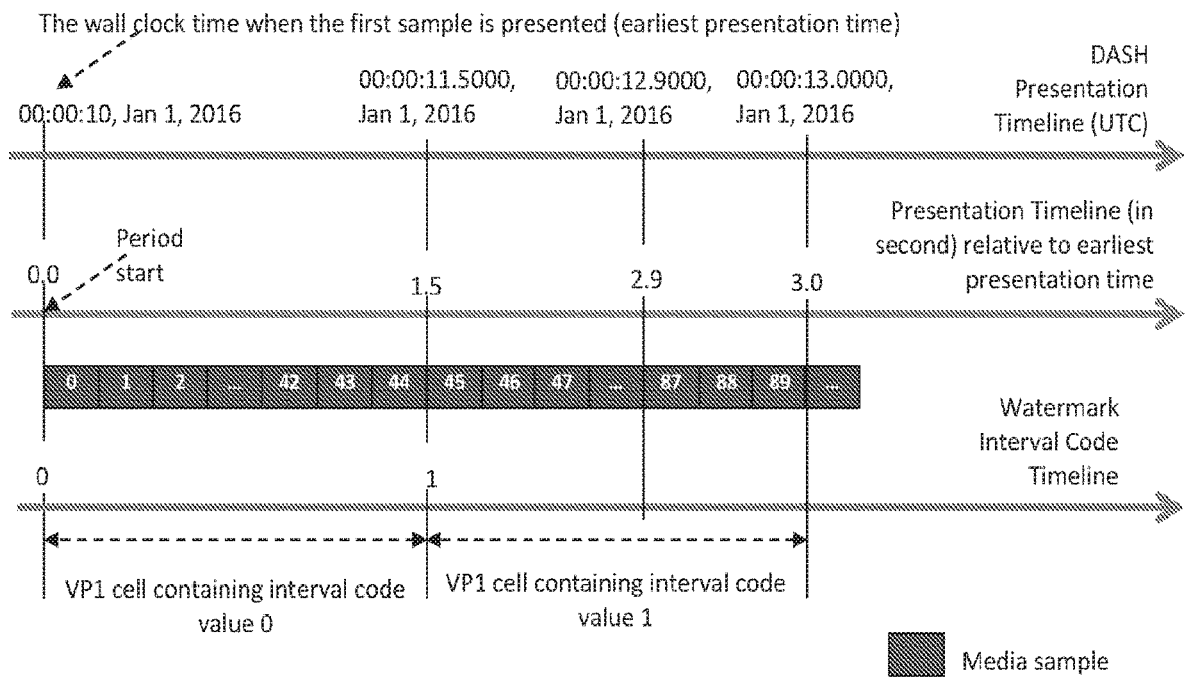
FIG. 7 illustrates mappings between watermark interval codes, DASH presentation times, and wall clock time.

For content delivered in ISOBMFF format, samples 0-89 shown in FIG. 7 are media samples as defined in ISOBMFF. All media data in a sample shares a same time stamp. For video content, a sample is typically a video frame. The duration of samples 0-89 is 3 seconds assuming the frame rate is 30 frames per second. For details regarding VP1 watermarks, see the above-mentioned US patent application US20150264429.

When the media segments are delivered to the receiver according to DASH, the receiver is required to have a source for wall clock UTC time. A Network Time Protocol (NTP)

hosted on the OS or a Content Delivery Network (CDN) server is typically used for delivery of UTC time to the receiver.

The availabilityStartTime field in DASH MPD defines a Segment availability time when the first content segment is available to the distribution network. All content segments of a given presentation described in the MPD have a common availability timeline.

For live broadcast, a fixed delay offset is sometimes specified in MPD to make sure that the live content is presented on all receivers approximately at the same time. This fixed delay is represented as a time relative to availabilityStartTime and defined as the suggestedPresentationDelay field in MPD. For example, if availabilityStartTime is the midnight on Jan. 1, 2016 and the fixed delay is 10 seconds, a receiver should present the first sample of the live content at 00:00:10, Jan. 1, 2016 no matter when the sample is available at the receiver for presentation. Thus, the sum of availabilityStartTime and availabilityStartTime represents the earliest presentation time in a MPD.

Calculation of the Anchor Time

DASH presentation time is represented as wall clock time in absolute UTC time. Watermark timeline is represented in the interval codes embedded in the content. Incremental interval codes are sequentially embedded in the order of the content presentation. An interval code is a value that identifies the interval of content in which a watermark payload value is embedded. A watermark segment is a continuous interval of watermarked content that contains incremental interval codes.

To map from watermark timeline to the presentation timelines, an anchor value (T) on the DASH presentation timeline is established for a watermark segment. For a watermark segment, T represents the DASH presentation time of the first sample (S) of the first content interval from which a specific interval code (N) is extracted.

T can be calculated as follows:

T=EarliestPresentationTime+PeriodStart+offset(S)

Where
1. EarliestPresentationTime is the earliest presentation time in absolute UTC in the MPD,
2. PeriodStart is the start time of the DASH period that contains the sample S, relative to EarliestPresentationTime,
3. offset(S) is the presentation time of the sample S in the period, relative to PeriodStart, which can be obtained in various methods. If content is available as ISOBMFF format, it is the composition time of the sample N calculated based on Decoding Time to Sample Box ("stts") and Composition Time to Sample Box ("ctts"). If the timing information is not available as metadata in the content, other methods such as audio sample counting can be used to calculate T.

As an example, shown in FIG. 7, the parameters for mapping timelines are given in the table below.

| Parameter | Value |
|---|---|
| N | 0 (assume that the anchor interval code value is 0) |
| T | 00:00:10, Jan. 1, 2016 |
| S | 0 |
| EarliestPresentationTime | 00:00:10, Jan. 1, 2016 |
| Period Start | 0 |
| offset(S) | 0 |

For a given T of a watermark segment, an interval code n can be mapped to the DASH presentation: PT(n)=1.5*(n−N)+T where n is an interval code value extracted from a marked content interval in the watermark segment and PT(n) is the DASH presentation time of the first sample (n) of the marked content interval. For example, the presentation time of first sample 45 of the marked content interval containing the interval code 1 is 87 00:00:11.5000, Jan. 1, 2016 as shown in FIG. 7.

Alignment Between DASH and Watermark Timelines

Watermark timeline is created when VP1 payloads containing consecutive interval codes are continuously embedded in a content stream. It is expected that the same timeline is recovered with extracted VP1 payloads in a watermark detector.

In order to have a precise mapping between DASH and watermark timelines, alignment between these timelines must be maintained. When overlaps or gaps are introduced in the DASH timeline (e.g., resulting from Media Segments with actual presentation duration of the media stream longer or shorter than indicated by the Period duration), the offsets represented by such overlaps or gaps at the position where overlaps or gaps are present need to be considered in mapping from the watermark timeline to the DASH timeline or vice versa. For example, such overlaps or gaps need to be subtracted from or added to the anchor time T as described in the previous section.

DASH allows for seamless switching between different Representations with different bitrates of a media segment for adaptive delivery of the content. Additional seamless transitions between DASH elements are possible with constraints defined in a system and signaling information described in the MPD:

- seamless switching between Adaptation Sets and each Adaptation Set may represent different codecs, languages, viewpoints, or roles of the content.
- seamless transition between Periods for the purposes of ad insertion, compensate non-constant segment durations, operation changes such as removal or addition of Representation or Adaptation Sets in the Period, removal or addition of Content Delivery Networks (CDNs).
- seamless transition between MPDs using MPD chaining, e.g., for the purpose of pre-roll ads, a sequence of programs using multiple MPDs.

In order to support seamless switching between the elements, the multiple versions of the same element (representative, adaptation set or period) are aligned (i.e., their boundaries are aligned in the media data). If each of the versions is embedded with identical watermarks, a continuous watermark timeline is maintained even if a presentation is created by switching between these switchable elements. Otherwise, the offset between the boundary of content segment carrying a watermark payload and the boundary of switchable elements needs to be considered in mapping between timelines.

Extension/Variations/Embodiments

Signaling File Generator for Each Service

A device that performs the steps 4-6 above is needed to generate signaling files for a broadcast service.

Optional Watermark Detection

Once the mapping is established, watermark detection step 5.a (shown in FIG. 6) may be skipped as long as continuous interval codes are embedded in the processed multimedia content and the mapping between timing systems does not change.

Broadcast Monitoring and Verification

Once the signaling file generator detects an unexpected discontinuity in interval codes extracted by watermark detector, a notification is provided to the broadcasters. Such discontinuity may be caused in watermark embedder, content encoding and packaging or transmission.

Prediction of Signaling File

To avoid possible latency introduced by signaling file generator, a signaling file can be generated prior to detection of the interval code that is associated with the signaling file. For example, assume a mapping between the first and second timing systems has been established, continuous interval codes are embedded in the current service, and content identifier is not expected to change. If the currently detected interval code is n, a new signaling file can be created which contains the interval code value n+1 and the rest information in the current signaling that is associated with the interval code n.

Timing Information Using Fingerprint

As disclosed in U.S. patent application US20160057317 described above, the first timing information can also be obtained using fingerprint extraction and matching.

Application-Based Reporting of Media Consumption

In another embodiment a system and method for application-based reporting of media consumption is disclosed. Information from Over-The-Top (OTT) metadata (such as content ID's, sources and original broadcast time) is combined with timing from the application (including start and stop times) to populate data in Content Data Messages (CDMs). This allows a broadcast timeline to be built against which the consumer's viewing can be mapped. When a consumer begins OTT viewing, the system captures the metadata which includes the air date and time of the content. The air date and time is used in the CDM as broadcastStartTime. When viewing ends (completes playing or is paused or stopped by the consumer), the duration of the viewing is used to determine the broadcastEndTime. If a consumer skips within the content, the application's data on viewing position is used to determine the position of the consumed content on the broadcast timeline. The system allows comparison of consumption of OTT data with broadcast data by standardizing the data reported, thus bridging the gap between broadcast data used for ATSC-defined CDMs and data available for OTT content.

This solution allows comparison of consumption of OTT data with broadcast data by standardizing the data reported. The software populates the ATSC-defined CDMs using metadata and other data available from OTT applications (e.g., playback start and stop times). Unlike the use of watermark or fingerprinting data, this analysis is unobtrusive and does not require direct access to the content. Current OTT usage reporting is specific to the technology and platform used. Most OTT applications provide proprietary reporting data that is not standardized, thus usage data is not comparable across delivery mechanisms, or even between application providers.

Other forms of measurement use fingerprinting or watermarking to determine content being consumed. This is challenging for application developers as the content is not usually accessible for detection purposes. This software combines information from the OTT metadata (content IDs and sources as well as original broadcast time) with timing from the application (start and stop times) to populate data in the CDM, bridging the gap between broadcast data used for ATSC-defined CDMs and data available for OTT content.

The metadata allows the software to build a broadcast timeline against which the consumer's viewing can be mapped. When a consumer begins OTT viewing, the software captures the metadata which includes the air date and time of the content. The air date and time is used in the CDM as broadcastStartTime. When viewing ends (completes playing or is paused or stopped by the consumer), the duration of the viewing is used to determine the broadcastEndTime. If a consumer skips within the content, the application's data on viewing position is used to determine the position of the consumed content on the broadcast timeline.

This solution allows comparison of consumption of OTT data with broadcast data by standardizing the data reported. The solution consists of lightweight usage reporting client (LURC) software that is resident on a media consumption device using a media application and a processing entity called a CDM Builder (CDMB) that uses data from the client to create Consumption Data Messages (CDMs) as defined by ATSC. Using CDM-based reporting data allows comparison across delivery mechanisms or application providers, unlike current OTT usage reporting which is specific to the technology and platform used.

Unlike the use of watermark or fingerprinting data used by other forms of measurement, this analysis is unobtrusive and does not require direct access to the content, which is crucial as this content is not usually accessible to media applications for detection purposes.

In addition, many consumption devices have extremely limited resources available for processing metadata and reporting usage. The use of an intermediary to construct the CDM usage data alleviates many of the concerns that application developers may have regarding the addition of reporting to their systems.

The LURC reports playback start and stop times along with a media ID that can be used as a reference key to obtain additional data about the content. The CDMB populates CDMs using the timing data from the LURC along with metadata obtained using the media ID, e.g., via queries to other entities or to data stored at a database managed by CDMB.

Figure 8:
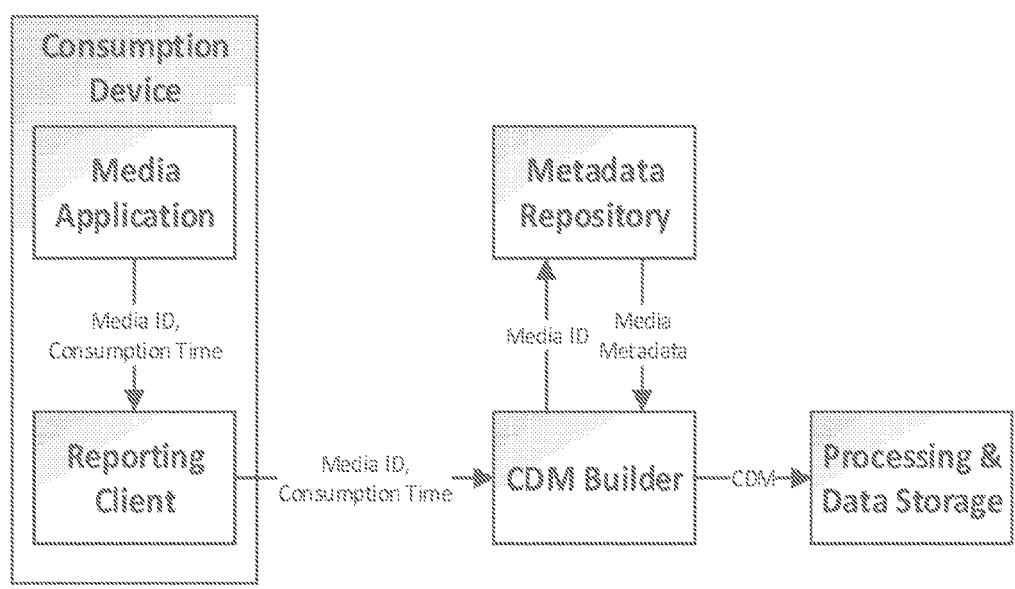
FIG. 8 illustrates a system for generating ATSC Consumption Data Messages.

Consumption Data Messages (CDM's) from Over-the-Top (OTT) Metadata and Playout Information Via an Intermediary Entity Referring now to FIG. 8, this embodiment allows the combination of information from the OTT metadata (content IDs and sources as well as original broadcast time) with timing from the media application to populate data in the CDM, bridging the gap between broadcast data used for CDMs and data available for OTT content with minimal impact to the performance of the media application.

The metadata allows the CDMB to build a broadcast timeline against which the consumer's viewing can be mapped. When a consumer begins OTT viewing, the LURC captures the media ID, which can be used by the CDMB to determine the air date and time of the content. The air date and time is used in the CDM as broadcastStartTime. When viewing ends (completes playing or is paused or stopped by the consumer), the duration of the viewing is used to determine the broadcastEndTime. If a consumer skips within the content, the media application's data on viewing position is used to determine the position of the consumed content on the broadcast timeline.

Application-Based Reporting of Media Consumption—Data Collection and Presentation Introduction This section discusses audience measurement as it pertains to applications, or "apps". These apps can be resident on a platform such as Roku, a set-top box (STB) or a digital video recorder (DVR), or on a mobile device. The measurement described in this document may also apply to user interaction with content via a web browser.

Platforms include

Over-The-Top (OTT) Apps on Roku, Amazon FireTV, Apple TV

Playstation View, Sling, HuluLive

Mobile Apps (general viewing or station-specific) running on iOS, Android

Desktops using browsers such as Chrome, Microsoft Edge/IE, Mozilla Firefox

Data that is currently available to broadcasters is not consistent across consumption platforms. Most broadcasters have access to precise viewing data from browsers and mobile devices via Google analytics, Omniture/Adobe analytics, etc. Tools for other platforms (e.g., Roku) don't always provide viewing data with the same level of precision and additional data as the mobile platforms provide, or if they do, they charge premiums for the information.

The present embodiment will be discussed in the context of the Aspect watermark-based audience measurement product available from Verance corporation (www.verance.com) Potential Aspect customers report that the information they have for application-based viewing is not accepted by advertisers and cannot be used for marketing ad placement in their content.

The intention of Aspect Reporting for Applications is to provide data that is consistent across platforms, not to replace the detailed second-by-second consumption information offered by some application platforms.

Use Cases

Users interact with streaming apps in a different way than they interact with linear broadcasts, so measurement via apps will necessarily be different from measurement of linear broadcast television.

However, it is possible to create an aggregate measurement for broadcast and streaming of some content. In cases such as live streaming, the total audience may be calculated by summing the number of viewers of the linear broadcast with those viewers using streaming in its many forms. This will be discussed later in this document as there are cautions around ad loads that come into play when aggregating different delivery mechanisms.

App reporting has a number of distinct use cases:

Live streaming of current broadcast

Time shifted viewing of broadcast

Viewing of mixed content, some that was broadcast, some that was not

Viewing of content that was not broadcast

In the first two cases, cross-platform measurement is fairly straightforward. The third case will be challenging, as only portions of the content will correspond to broadcast.

The last use case will not involve mapping to broadcast time and audience, as there is no broadcast for comparison. However, reporting on this usage is still important to provide consistency.

Live Streaming

Live Streaming is viewing the current broadcast using an OTT mechanism at the same time as it is broadcast over the air (OTA) and/or via cable or satellite. For our purposes, this includes any advertisements and interstitials as broadcast.

If different advertisements are shown during streaming, that would be considered mixed content. However, if the content is streamed as it was broadcast but different advertisements are presented prior to the initiation of streaming, the supplemental ad portion would be "Non-Broadcast" and the program content would be Live Streaming.

Time Shifted Broadcast

Time-Shifted Broadcast refers to viewing a prior broadcast, including advertisements and interstitials as they were broadcast.

As for Live Streaming, if different advertisements are shown, that would be considered mixed content. However, if the content is presented as it was broadcast but different advertisements are presented prior to the initiation of viewing, the supplemental ad portion would be "Non-Broadcast" and the program content would be Time-Shifted Broadcast.

Mixed Content

Mixed Content is a combination of content that was broadcast and content that was not broadcast. This can occur when:

A news story is edited for length, but a longer version of the story is available for download or streaming A program available via streaming or download includes scenes that were not broadcast A program is presented with different advertisements than were broadcast In all these cases, the content that was broadcast will be compared to broadcast viewing, and the content that was not broadcast will be measured separately.

Non-Broadcast Content

Non-broadcast content is content that is exclusively available via apps, such as the new Star Trek series that is only available via subscription to CBS All Access. This content will be measured and the measurement results presented, but not compared to broadcast data.

Usage Metrics

Key usage metrics are:

Views: number of devices consuming content

Viewers: number of people consuming content

Content Impressions: number of people exposed to content, based on a minimum percentage of the content duration Views The basic unit of measurement for apps will be Views. This term is distinct from "Viewers", which implies individual persons. While linear broadcast measurement assumes that all members of a household are potential viewers, the number viewers of an app can vary greatly depending on the platform on which the app is being run. Viewers of mobile apps are typically one individual (unless sent to a large screen via a device such as a ChromeCast), but viewers of other apps can be an entire household if the app is on a device such as a Roku.

Every streaming start to a target device is considered a View. Both Total and Unique Views will be used, as described below.

Total Views counts each session within a time period individually.

Unique Views counts multiple sessions of the same program as one Unique View.

For example, if the viewer starts watching at 6:00 pm, stops at 6:10 pm and then starts watching again at 6:42 pm, this is counted as two Total Views, and one Unique View for the time period from 6 pm to 7 pm.

To be considered a View, the content must be actually consumed. Content that is downloaded but not viewed, for example, is not counted as a View. A Live View requires that 30 seconds or more of content be consumed during the reporting time period. Average Quarter Hour (AQH) viewing will be calculated by summing the number of viewing seconds for each unique device. A device with a total of more than 300 seconds within a 15-minute period is counted as one AQH View. For minute-by-minute viewing trends, a View is a unique device that consumes more than 30 seconds of content during a given minute.

Viewers

Because we are measuring content consumption at the device level, it is possible to tell what is being consumed, as well as when viewing occurred and for how long, but it is not possible to determine precisely who is watching the content. Demographic data about household composition will be available, but the exact individuals consuming the content will not be known.

Content Impressions

The number of people exposed to a program or piece of content. This is based on a TBD minimum percentage of the content consumed, as the duration of streaming clips tend to vary widely.

Potential Views

Data that would be useful to determine Potential Views (akin to HUT or Universe in the broadcast world) includes:
  Number apps installed (not applicable to web browser views)
  Number unique devices using the app in last N days
  Number of unique devices using app during each day
  Number of devices using app at a particular time
  Population of everyone over 2, 12, or 18 years old in the LMA of the station related to the content
  A value that is defined by the report user as potential views (e.g., input via the reporting interface)
  Note: TV and radio ratings are usually based on the number of people residing in the area that are over two years of age (i.e., the 2+ population of the area).

Comparison to Broadcast

The app audience can be compared to or combined with the broadcast audience when the broadcast and app content overlap. When content differs between the distribution methods, this will be indicated in reports, for example showing the measurement in dashed lines or an alternate color.

Reporting Sources

Table 1 shows a matrix of different types of content, their sources and delivery methods, and what entity (device or software) could be used to report usage.

TABLE 1

Sources for Viewing Local & Network Television Content

| Source | Content Type | Delivery Method | Code/Abbreviation | Reporting Entity |
|---|---|---|---|---|
| Broadcast | | | | |
| Broadcast | Live | Over-the-Air | OTA | CTV |
| Broadcast | Recorded | Digital Video Recorder | DVR | CTV or DVR |
| MVPD | Live | Set-top Box | STB | CTV or STB |
| MVPD | Recorded | Set-top Box + DVR | STB-DVR | CTV, STB, or DVR |
| MVPD | On-Demand | Set-top Box VOD | STB-VOD | CTV or STB |
| Digital | | | | |
| OTT | Live | OTT Device + App | OTT-LIVE | CTV, OTT Device, or OTT App |
| OTT | On-Demand | OTT Device + App | OTT-VOD | CTV, OTT Device, or OTT App |
| Mobile | Live | Mobile Device + App | MOBILE-LIVE | Mobile Device or App |
| Mobile | On-Demand | Mobile Device + App | MOBILE-VOD | Mobile Device or App |
| Desktop | Live | Web Browser | DESKTOP-LIVE | PC or Browser Plugin |
| Desktop | On-Demand | Web Browser | DESKTOP-VOD | PC or Browser Plugin |
| vMVPD's, Sub-Category of OTT | | | | |
| vMVPD | Live | OTT | vMVPD-LIVE | CTV, OTT Device, or OTT App |
| vMVPD | Live | Mobile | vMVPD-LIVE | Mobile Device or App |
| vMVPD | Live | Browser | vMVPD-LIVE | PC or Browser Plugin |
| vMVPD | Recorded | OTT | vMVPD-CloudDVR | CTV, OTT Device, or OTT App |
| vMVPD | Recorded | Mobile | vMVPD-CloudDVR | Mobile Device or App |
| vMVPD | Recorded | Browser | vMVPD-CloudDVR | PC or Browser Plugin |
| vMVPD | On-Demand | OTT | vMVPD-VOD | CTV, OTT Device, or OTT App |
| vMVPD | On-Demand | Mobile | vMVPD-VOD | Mobile Device or App |
| vMVPD | On-Demand | Browser | vMVPD-VOD | PC or Browser Plugin |

Architecture and Components

The reporting system for applications begins as content is made available, at the point of broadcasting, multicasting, or unicasting. Content is packaged into segments for streaming via technologies such as DASH (Dynamic Adaptive Streaming over HTTP) or HLS (HTTP Live Streaming). Note that, although this document refers specifically to broadcast content, the components and techniques described could be used for non-broadcast content (e.g., supplemental content streams, VOD, etc.).

Components of the system include:
  Broadcast Playout: The existing system used to distribute broadcast content (e.g., ATSC 1.0, ATSC 3.0, DVB)
  Watermark Embedder: A system that embeds a watermark in content such as audio or video
  Publisher: The existing system used to transcode and configure broadcast content into a format suitable for streaming
  Watermark Detector: A detector that is capable of extracting the watermark payload in real-time
  Timed Metadata Creator: A software application that inserts either watermark payload data or Media ID and broadcast timing data into metadata used in streaming applications (e.g., emsg, ID3 tags)
  Stream Packager: The existing system used to encapsulate and distribute broadcast content as streaming content (e.g., DASH, HLS)
  Consumption Device: A client of the streaming distribution system that ingests and renders streamed content
  Media Application: The application that ingests and renders content, usually resident on the consumption device. Extracts a watermark payload or Media ID, as well as timing information, from the Timed Metadata.

Reporting Client: An application that captures information about consumption time, any available watermarks or tags, and content metadata CDM Builder: A service or entity that uses data from the Reporting Client, along with data from the Metadata Repository, to build Consumption Data Messages (CDMs). The CDM Builder can either be part of the Consumption Device or a separate entity or service.

Metadata Repository: A service that provides information about broadcast content. Maps the Media ID to broadcast time and source.

Recovery Data Repository: A service that provides information about broadcast content. Maps the watermark payload to broadcast time and source.

Signaling File Repository: A source of content and data files (not discussed in this document).

Processing & Data Storage: The system that processes and stores CDMs.

Figure 9:
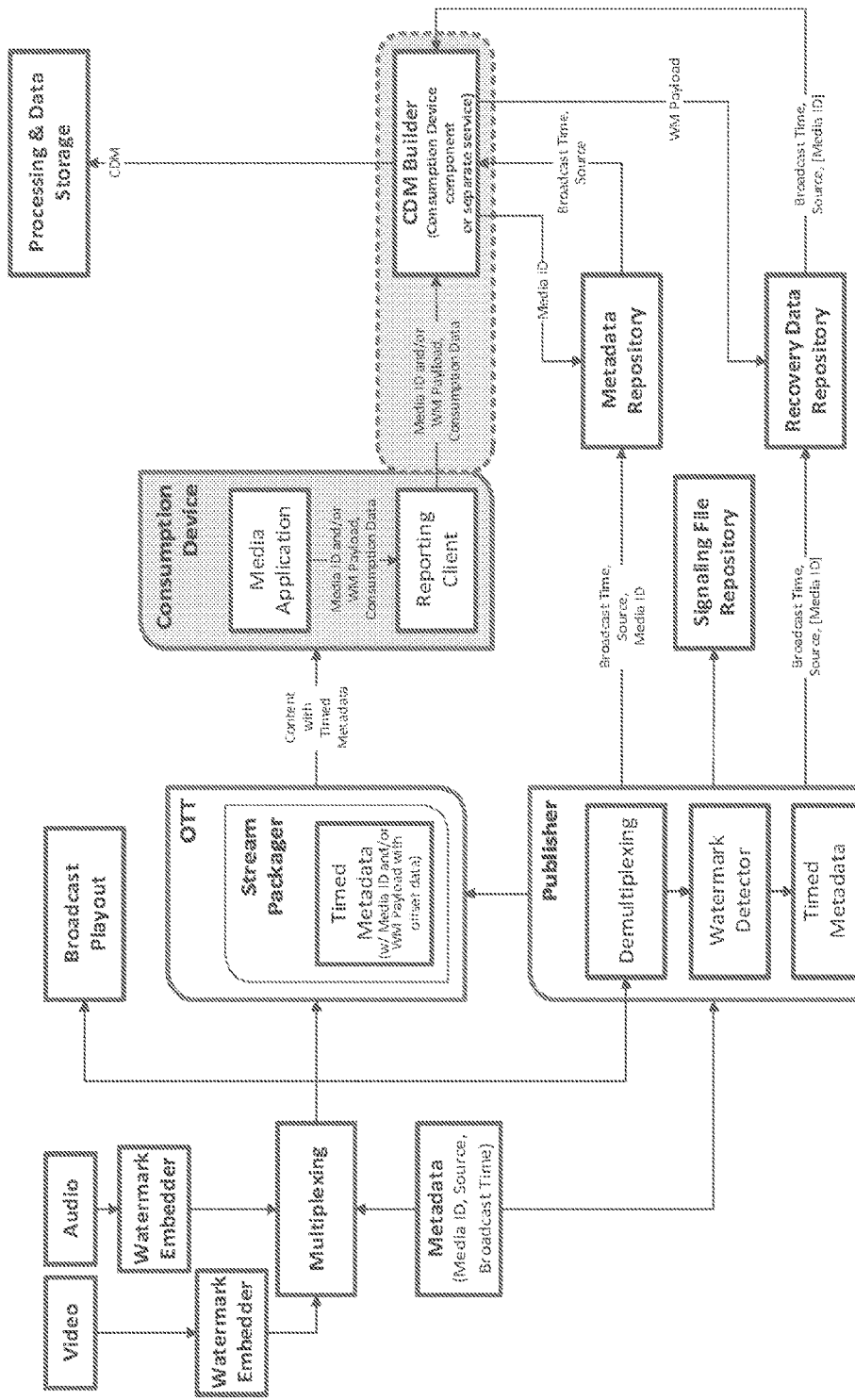
FIG. 9 illustrates an application reporting system.

An overview of the App Reporting System is shown in FIG. 9 shows the data flow through the content distribution and usage reporting system. An example of potential workflows is outlined below, but additional workflows using similar components are possible.

Audio and/or video content is watermarked prior to multiplexing for broadcast. The watermark can indicate information such as the broadcast source and time. This content is multiplexed with metadata and other broadcast information.

Figure 11:
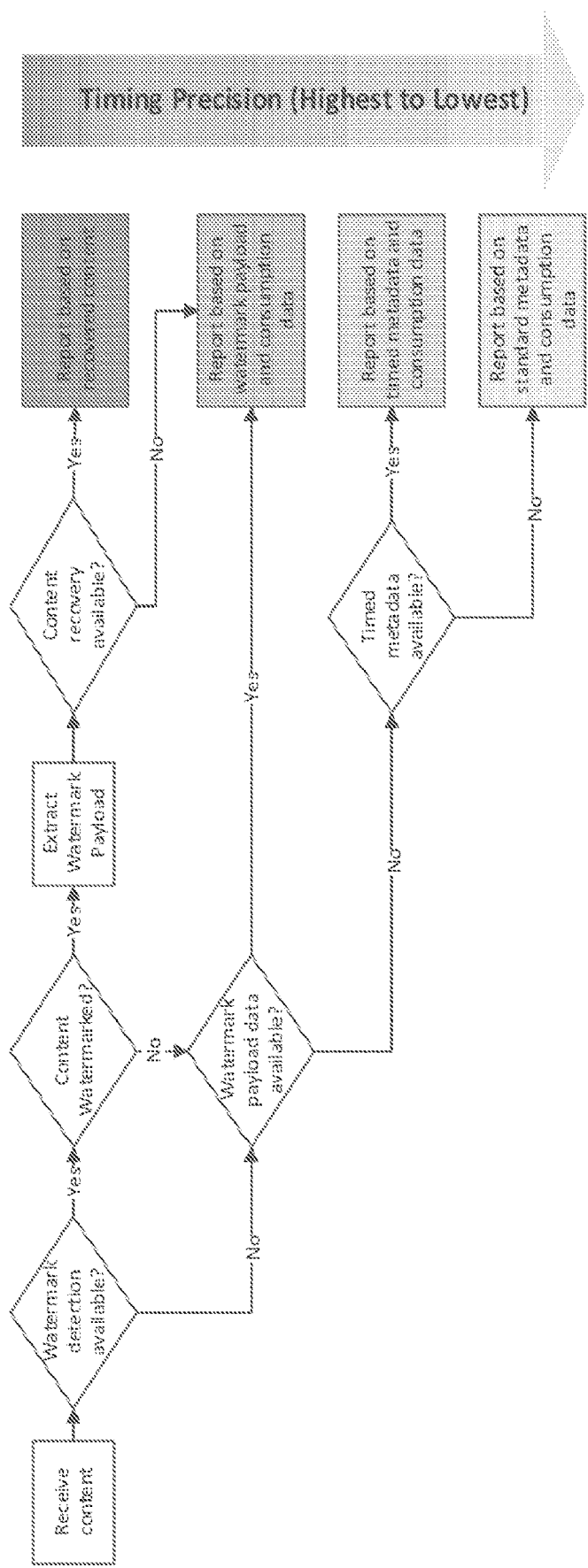
FIG. 11 illustrates data processing at a streaming client.

The Publishing tool takes this information and content and creates a data stream or files that are suitable for streaming. This may include detection of watermarks in content to create Timed Metadata. If the content is not watermarked, or if watermark detection is not present in the Publishing tool, the Timed Metadata can be created based on the broadcast metadata (broadcast time, source, Media ID, etc.). If Timed Metadata is not created, the Consumption Device will use standard metadata for reporting (see FIG. 11.).

If using watermarks, the publishing tool also calculates the watermark offset, which is the number of milliseconds since the start of the first 1.5-second watermark segment.

The processed content and metadata is passed to the OTT tool for packaging and distribution. The Consumption Device receives the content, presents it to the end user, and provides the metadata to the Reporting Client. The Reporting Client extracts the key information from the metadata, along with consumption information, and passes this to the CDM Builder (which can be part of the Consumption Device or can be a separate service or entity).

Figure 10:
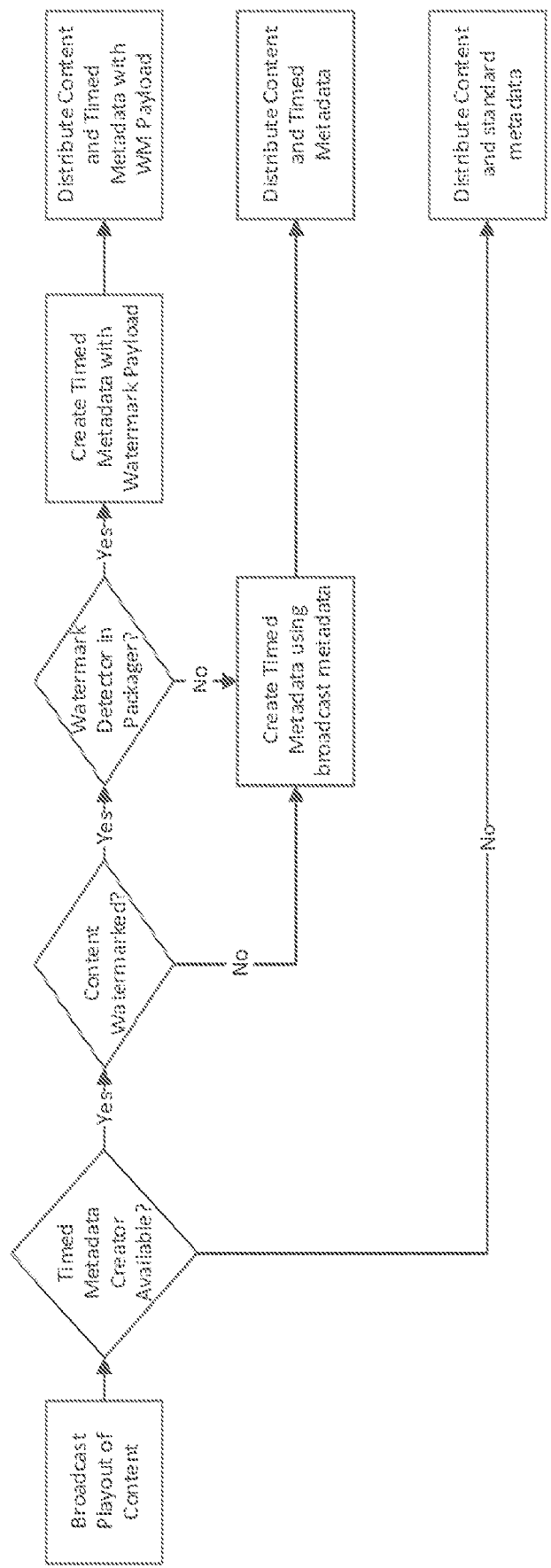
FIG. 10 illustrates a data preparation process.

The CDM Builder retrieves recovery data (based on the watermark) and/or metadata information (based on the Media ID) and uses this information, in conjunction with the consumption data, to construct CDMs. The data flow for data preparation is shown in FIG. 10.

The data processing at the streaming client can be performed in a number of ways, depending both on the incoming data stream and the client features. See FIG. 11, which shows the data processing at the Streaming Client. Some OTT applications, such as web browsers, may be able to detect watermarks. If a watermark detector is available, content recovery may proceed using recovered content, or the watermark payload can be passed through the Consumption Device's Reporting Client to the CDM Builder. However, many platforms and application toolsets for devices such as phones and tablets are not designed to easily allow the insertion of a detector into the audio or video path. In these cases, alternative methods of obtaining the broadcast time are employed. This can be based on Timed Metadata or on standard metadata available to applications.

Timed Metadata is joined with consumption data (playback timing, etc.) by the Reporting Client. This information is passed to a CDM Builder that can be a separate service or internal to the Consumption Device.

Reporting Data

Data is reported in the CDM format. The CDM schema allows additional properties to be defined; additional fields can be added to CDMs and they will still be compliant with the ATSC specifications.

Consumption Data

The watermark is used to determine both the source of the content and the time at which it was broadcast. A number of metadata fields exist to determine the content source, but special processing is required to determine the broadcast time.

Sources of Timeline Data

The best available source should be used to obtain the timeline information. The sources, in order of preference, are:

1. Watermark Detection: When use of the watermark is possible, data recovery and reporting can occur for these apps as it does for other distribution methods that use watermark detection.
2. Timed Metadata with Watermark Payload: If content includes metadata containing the watermark payload, that information can be used to determine the broadcast timeline by obtaining the recovery data (either using ATSC recovery methods or a separate process).
3. Timed Metadata with Media ID: Timed Metadata, if present, references the broadcast time in UTC as well as other information via the Media ID.
4. Standard Metadata: If no Timed Metadata is available, the Consumption Device uses standard metadata to determine the approximate broadcast timeline.

While Timed Metadata is the most straightforward method of determining the broadcast timeline, the watermark is preferred as it is integral to the content (tags may be removed or altered by intermediaries). Timed Metadata with watermark payloads will provide more consistent and precise timing information than Timed Metadata with Media IDs. Both are more precise and consistent across platforms than standard metadata.

Mapping to Broadcast Timeline

Playback data from the app can be used to determine which content was consumed, and this can be mapped to the broadcast timeline. Apps have access to information about the position of the content being presented relative to the content stream (i.e., the current position within the stream).

For example, suppose the first segment of content was broadcast at 8:02 PM. If the app reports that the user watched the entire first minute of the content, then skipped ahead three minutes and watched two more minutes, we can determine that content between 8:02 and 8:03, and between 8:06 and 8:08, was viewed.

Timing Data Source

As the precision of the timing data will vary between different sources, the CDMs should include a field that indicates the data source. Values should include:

Watermark Recovery (default, assumed if the data source field is not present): the content watermark was used in the content recovery and reporting process Timed Metadata with Watermark Payload: Timed Metadata with the watermark payload was used to calculate the broadcast time Timed Metadata with Media ID: Timed Metadata with a Media ID and broadcast timing data was used to calculate the broadcast time Standard Metadata: Content metadata was used to infer the broadcast time Location The data reported must include information about where the content consumption occurred geographically. For example, we would like to determine whether the consumption happened inside the market area of the content's origin or outside it. Ideally, this data would be provided by the platform's geolocation service (latitude and longitude). If this is not available, an IP address lookup could be used.

Reporting Device

Device IDs will be assigned per application, not per device. For example, if a tablet has station KTAN's news alert application, Chrome, and the HuluLive app, that tablet will have three device IDs. The device ID included in the usage report will be the device ID that corresponds to the application that was used to consume the content.

Device fields that are tracked currently include:

Device ID

Model

Manufacturer

Operating System

Peripheral device (true or false)

Data about the reporting device should also include the delivery method and reporting platform and version as reports will need to specify these (e.g., number of Views on Roku vs. Amazon vs. station app on mobile).

Additional Data

Additional data may be available via the content metadata or other sources. To take full advantage of application-based data, CDMs can be extended to include extra data available to apps such as tags (e.g., "local", "city_hall", "pets"), duration of VOD clip, ad data, etc.

Data Validation and Processing

Data validation will follow MRC standards for data filtration of suspicious data. Bridging values and other details will be determined during the design phase, in accordance with guidelines such as those set forth by the Market Research Council (MRC) and others as appropriate.

Reports

Total Live Views

Between 6:00 pm and 6:30 pm, how many total views of live content were measured within the market area? The objective of this report is to determine how many views of live content occurred during a specific time period or program for a minimum amount of time. The user will enter the market, station, apps (one, multiple or all), date range, and time period or program name. This report will show a summary of all live views and will allow the user to drill down into the data by platform type and platform type detail.

Filters and Selectors

Market

Station/Source

Apps: selection of one, multiple, or all apps

Date Range

Timeperiod or Program

Summary

A summary of the total live views by time period is shown in FIG. 12.

By Platform Type

Figure 13:
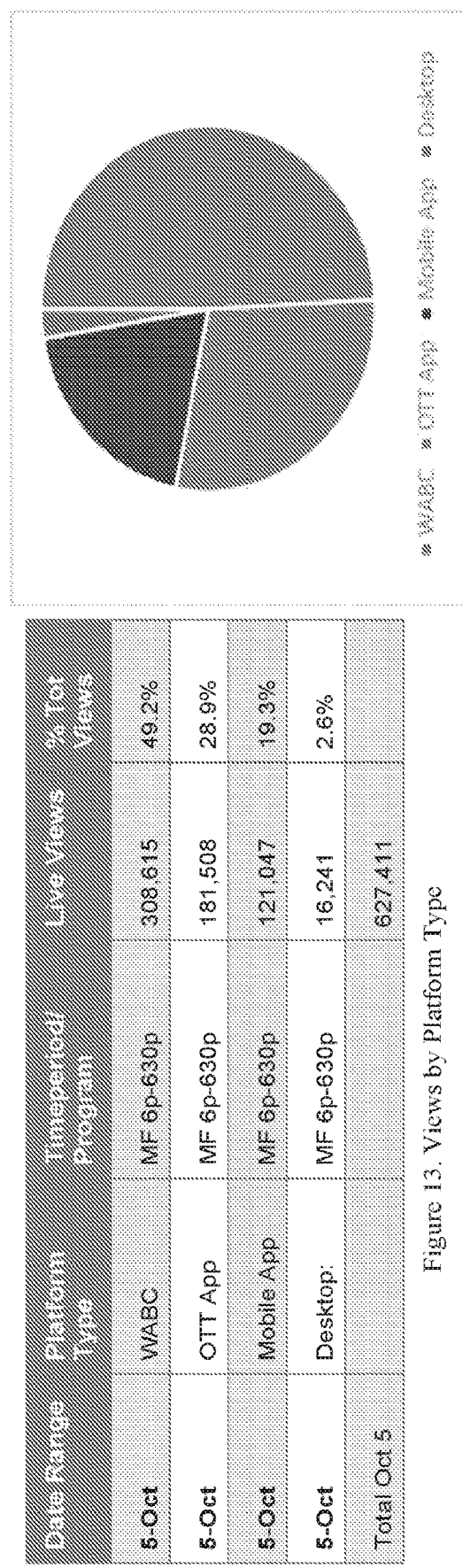
FIG. 13 illustrates views by platform type.

FIG. 13 shows the views by platform type. Repeats the table shown below for each date in range and provides summary over total date range.

Platform Type Detail

Figure 14:
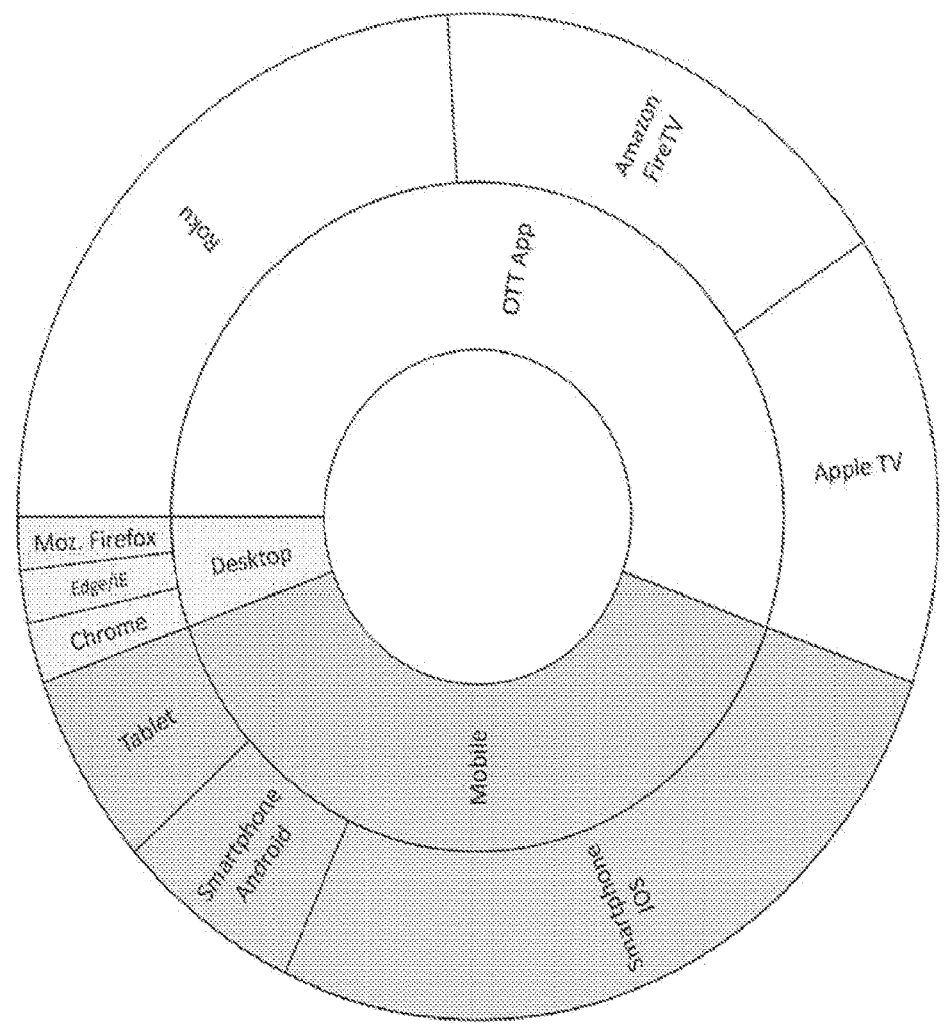
FIG. 14 illustrates views by platform type detail.

FIG. 14 shows the views by platform type detail. When drilling into details for October $5^{th}$, timeperiod of MF 6p-630p, the report below is shown in FIG. 14.

Geographical Distribution of Views

Between 6:00 pm and 6:30 pm, how many total views of live content were measured, and where were the viewers located? The objective of this report is to determine where views of live content occurred during a specific time period or program for a minimum amount of time. The user will enter the market, station, apps (one, multiple or all), date range, and time period or program name. This report will show a summary of all live views and will indicate where the views were measured. The user can drill down into the data by platform type and platform type detail.

Filters and Selectors

Market

Station/Source

Apps: selection of one, multiple, or all apps

Date Range

Timeperiod or Program

Summary

FIG. 15 shows the total live views by time period and location.

By View Location

Figure 16:
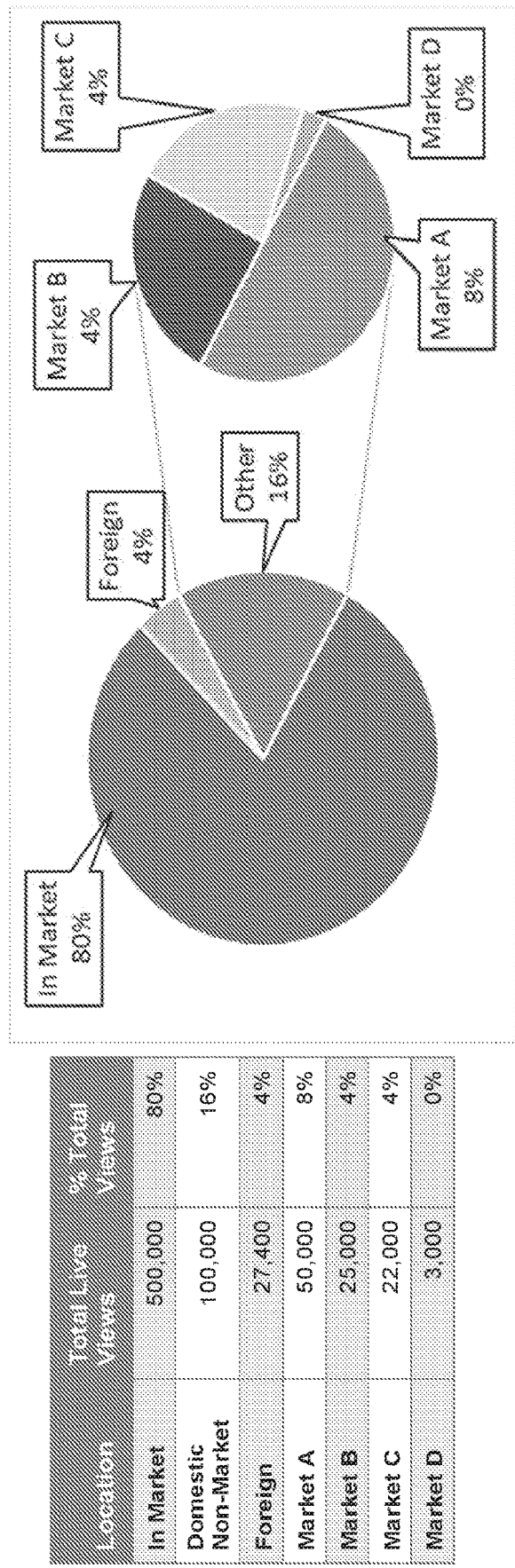
FIG. 16 illustrates views by location.

FIG. 16 shows views by location. Repeats the table shown below for each date in range and provides summary over total date range.

Date Range: 5 October

Timeperiod/Program: MF 6p-630p

By Platform Type and Platform Type Detail

The report shows further tables and charts of geographical viewing breakdowns by platform and platform type.

Average Quarter Hour Audience and Rating

Between 6:00 pm and 6:30 pm, what is the Average Quarter Hour (AQH) Audience and Rating (defined as watching 5 minutes within a 15-minute period) of live content? The objective of this report is to determine how many QHVs of live content occurred during a specific time period or program. The user will enter the market, station, apps (one, multiple or all), date range, and time period or program name. For this report, the user will also select the market population base (such as the 2+, 12+, or 18+ population of the market) or to input their own value for AQH Rating (denominator). The value and value source will be shown in the report. This report will show a summary of all live QHVs and will allow the user to drill down into the data by platform type and platform type detail.

Filters and Selectors

Market

Station/Source

Apps: selection of one, multiple, or all apps

Date Range

Timeperiod or Program

Summary

FIG. 17 shows a summary of the total live QHVs by time period.

By Platform Type

Figure 18:
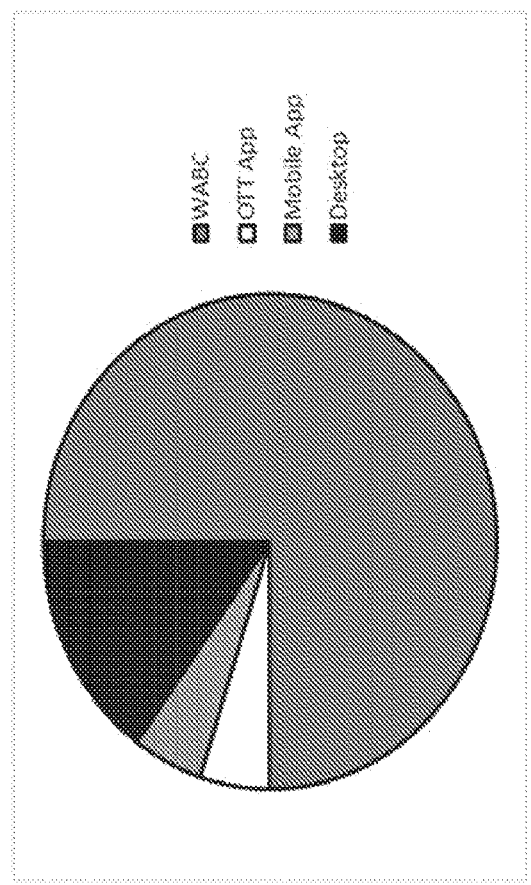
FIG. 18 illustrates QVHs by platform type.

FIG. 18 shows QHVs by platform type. Repeats the table for each date in range and provides summary over total date range.

Time Period Summary

Figure 19:
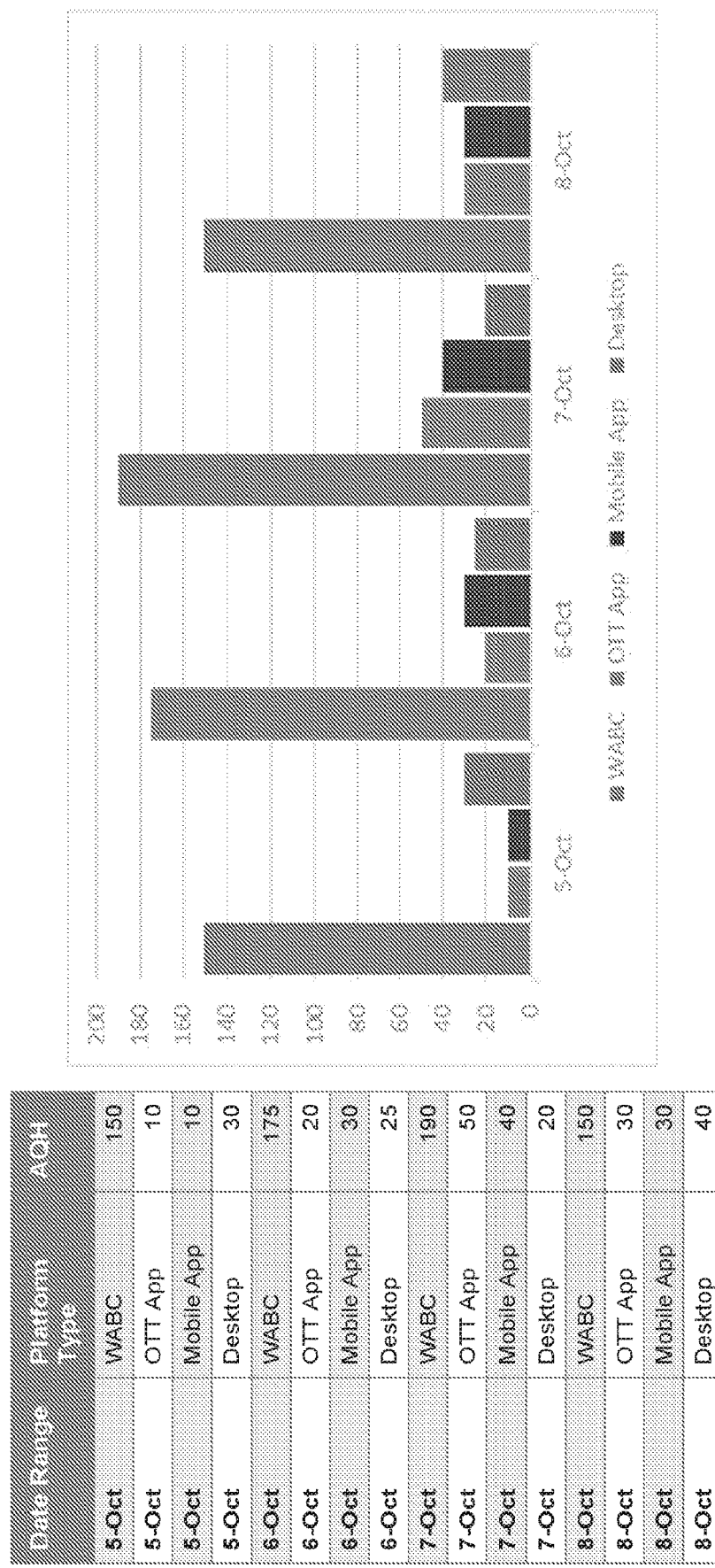
FIG. 19 illustrates the AQH trend.

FIG. 19 shows AQH trend, including a summary trend across multiple dates for the timeperiod of MF 6p-630p.

Unique Live Views

Between 6:00 pm and 6:30 pm, how many unique viewers of live content were measured within the market area? The objective of this report is to determine how many unique views of live content occurred during a specific time period or program. The user will enter the market, station, apps (one, multiple or all), date range, and time period or program name. This report is the same as the Market Live Views report; the only difference is that this report shows unique views instead of total views.

Total Live Views by Duration

Between 6:00 pm and 6:30 pm, what is the frequency distribution of viewing duration for Total Views or Unique Views? The objective of this report is to analyze the duration of live content views during a specific time period or program for a minimum amount of time. The user will enter the market, station, apps (one, multiple or all), date range, and time period or program name. The user selects whether to show total views, unique views, or both. This report will show a summary of view durations and will allow the user to drill down into the data by platform type and platform type detail.

Figure 20:
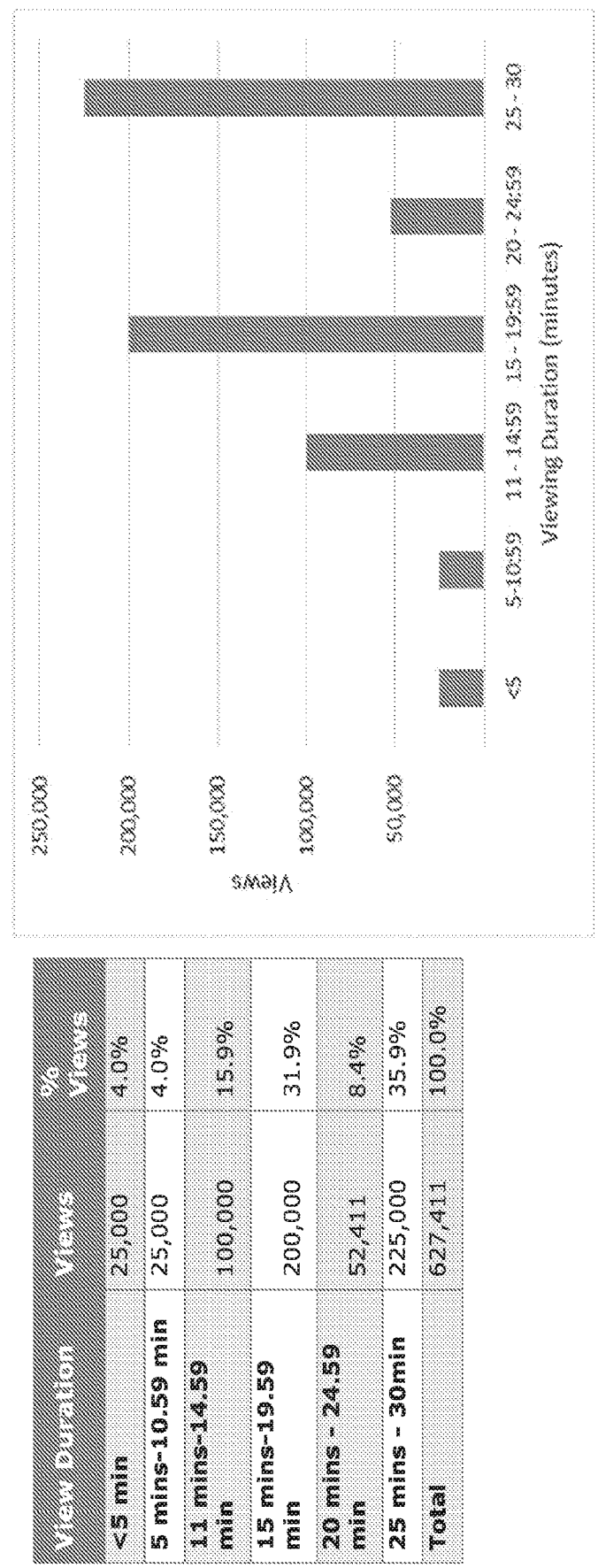
FIG. 20 illustrates live views by viewing duration.
Figures 21, 22:
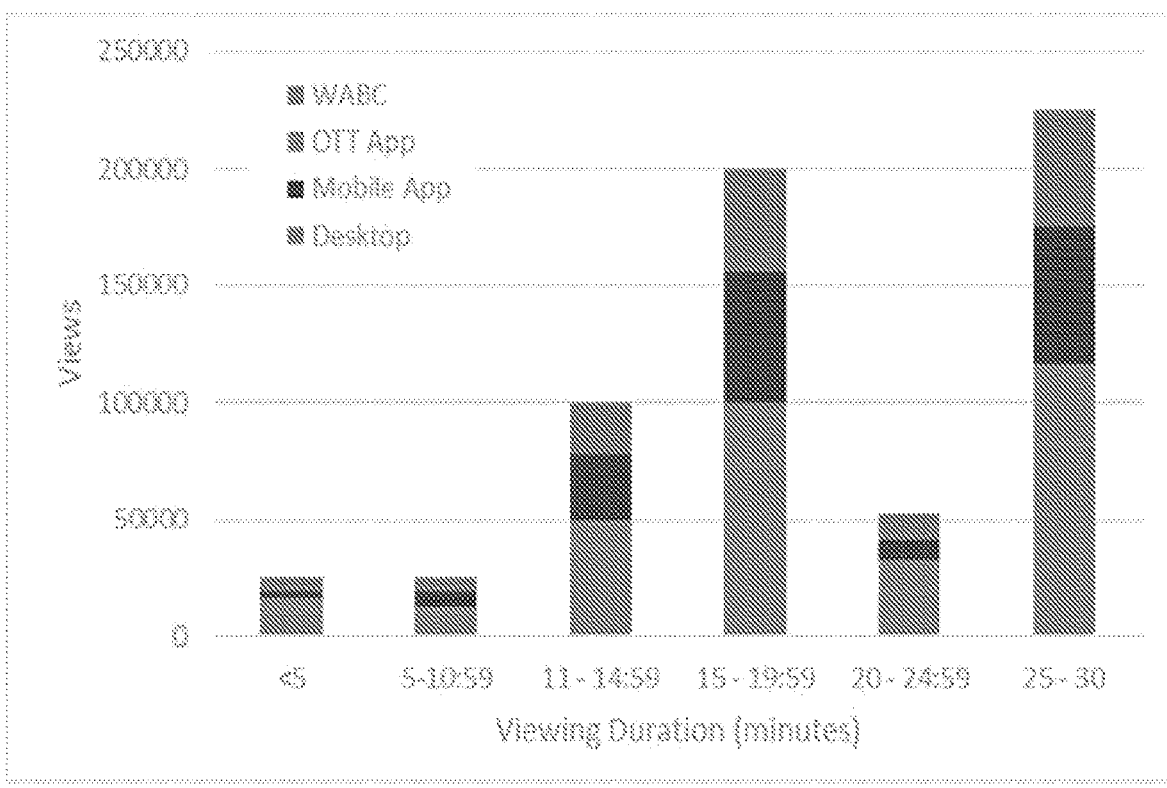
FIG. 21 illustrates a tabular view of view durations by platform type.
FIG. 22 illustrates a graphical view of view durations by platform type.

Filters and Selectors
Market
Station/Source
View Type (Total, Unique, or Both)
Apps: selection of one, multiple, or all apps
Date Range
Timeperiod or Program
Summary FIG. 20 shows live views by viewing duration
Date Range: 5 October
Timeperiod/Program: MF 6p-630p
  By Platform Type FIG. 21 shows view durations by platform type: tabular view.
Date Range: 5 October.

FIG. 22 shows view durations by platform type: graphical view.
  By Platform Type Detail
  The report shows further tables and charts of viewing duration breakdowns by platform type.

Live View Trend

Between 6:00 pm and 6:30 pm, when were Live Views measured? The objective of this report is to determine how the number of unique concurrent live content views varies during a specific time period or program for a minimum amount of time. The user will enter the market, station, apps (one, multiple or all), date range, and time period or program name. The user selects whether to show total views, unique views, or both. This report will show a summary of view durations and will allow the user to drill down into the data by platform type and platform type detail.

Figure 25:
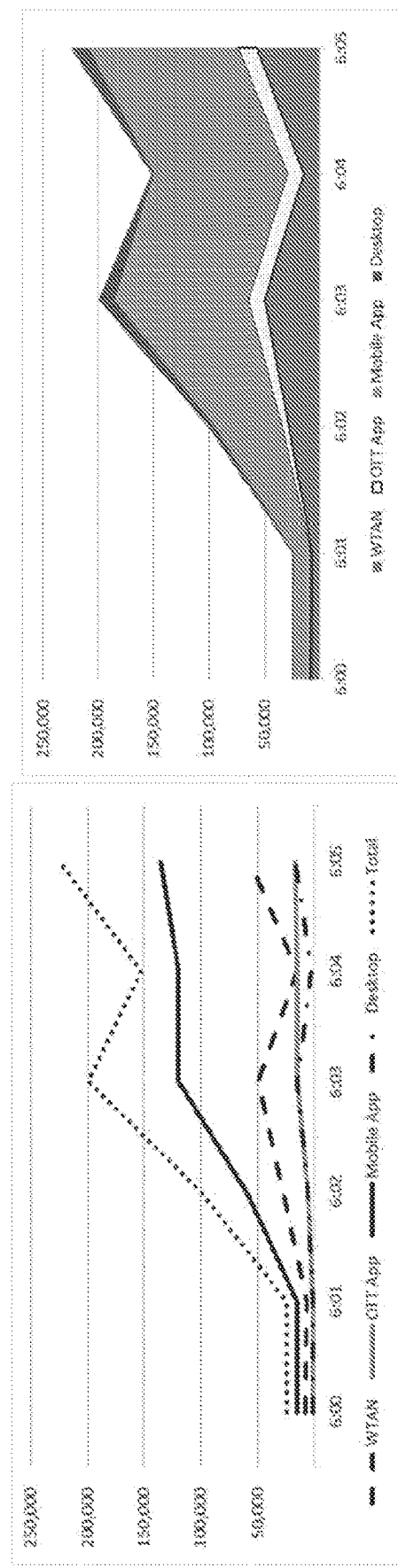
FIG. 25 illustrates a graphical view of minute-by-minute live views by platform type.

Filters and Selectors
Market
Station/Source
Apps: selection of one, multiple, or all apps
Date Range
Timeperiod or Program
Summary FIG. 23 shows live views, minute by minute.
Date Range: 5 October
Timeperiod/Program: MF 6p-630p
  By Platform Type FIG. 24 shows minute by minute live views by platform type: tabular view. FIG. 25 shows minute by minute live views by platform type: graphical view.
Date Range: 5 October
Timeperiod/Program: MF 6p-630p
  By Platform Type Detail
  The report shows further tables and charts of viewing duration breakdowns by platform type.

Definitions and Abbreviations

Definitions

Media Content is digital data whether in encrypted or unencrypted form that represents some combination of digitally encoded audio, video, and/or image content intended for output by the Product in a predetermined, continuous, sequential manner.

Media ID uniquely identifies content, allowing the system to determine the content source and broadcast time.

Playback is any operation performed by a Product for the purpose of producing or having produced a contemporaneous display of Media Content.

Abbreviations

TABLE 2

Abbreviations

| Abbreviation | Description |
| --- | --- |
| ATSC | Advanced Television Systems Committee |
| CDM | Consumption Data Message |
| DASH | Dynamic Adaptive Streaming over HTTP |
| DVR | Digital Video Recorder |
| HLS | HTTP Live Streaming |
| MVPD | Multichannel Video Programming Distributor |
| OTA | Over The Air |
| STB | Set-Top Box |
| UTC | Coordinated Universal Time |
| vMVPD | Virtual Multichannel Video Programming Distributor |
| VOD | Video On Demand |
| WM Payload | The payload data contained in a watermark. |

Usage Data from Applications

This section outlines the data that is required in usage reporting from apps developed for specific local broadcasters.

Use Cases

Content played via an app may be any of the following locally-sourced content:
1. Live streaming of current broadcast. Many apps only offer this during specific times of day (e.g., local news).
2. Previously-aired content.
3. Content that was broadcast by another station (e.g., a sister station). Some stations have one app for both stations, so that one app will have content from both.
4. Content that was not aired (clips that were either cut from the broadcast or were never intended to be broadcast, including consumer-sourced content).
5. Mixed content where an edited version of the content was aired, but the full content was not (e.g., "For more on this story, use our app").

Examples of use cases 1, 2, and 3 are provided at the end of this document. The data for use cases 4 and 5 is expected to be the same as the data for use case 2.

CDM Data

This table is based on the Extended CDM Format described in Service Usage Reporting: Verance Extensions. Please refer to that document, and to ATSC A/333, for additional details on the fields described below as well as the related schemas.

The following information uses examples from fictional station WKAW. A set of values for each station will be provided separately.

| Field | Cardinality | Description |
|---|---|---|
| CDM | 1 | Consumption Data Message object. Top level JSON object |
| ProtocolVersion | 1 | Major and minor version of CDM protocol The current version of the protocol is 0x00. |
| DeviceInfo | 1 | Consumption Device information |
| deviceID | 1 | Consumption device identifier For Aspect reporting, this value shall be set to the call letters of the station associated with the app followed by the device's MAC address, if available. If MAC address is not available, use another globally-unique identifier that will be consistent for this device. Example using MAC address: WKAWDTb8:27:eb:6b:5e:15 Example using a globally-unique ID: WKAWDTe05ddc0c-f3c1-45fe-be1d-79f46a74c6b7 |
| deviceModel | 1 | Consumption device model device model (e.g., Moto X) |
| deviceManufacturer | 1 | Consumption device manufacturer e.g., Motorola) |
| deviceOS | 1 | Consumption device Operating system and version (e.g., Android 5.1) |
| peripheralDevice | 1 | Indication if the consumption device is a peripheral device. For Aspect reporting, set this value to TRUE if the application is aware that the output is being directed to a remote screen (e.g. via iOS AirPlay or Google Cast); FALSE otherwise. |
| deviceLocation | 1 | Consumption device last known location |
| latitude | 1 | Latitude information from location service. If user has opted out of location usage from the app, use NOTREPORTED. |
| longitude | 1 | Longitude information from location service. If user has opted out of location usage from the app, use NOTREPORTED. |
| clockSource | 0 . . . 1 | Indicates whether the device clock has been set manually by the user or automatically by a service. This will typically be 1 (set automatically). Do not include this element if the clock source is unknown. |
| AVService | 0 . . . N | Array of AVService, including CDUs. |
| country | 1 | ISO 3166-1 alpha-2 country code associated with the primary administrative entity under which the given bsid is assigned. For apps associated with US-based stations, this value is "US" |
| bsid | 1 | Identifier of the entire broadcast stream BSID assigned to station that broadcast the content. Since BSIDs have not yet been assigned, Aspect is using the ATSC 1.0 TSID for reporting. |
| serviceID | 1 | Service identifier that identifies this Service within the scope of this Broadcast area. For Aspect reporting, this value is the major virtual channel number concatenated with the minor channel number (sub-channel) padded to 2 digits. For example, subchannel 3 of station 42 would have a service ID of 4203. For Aspect App-based reporting, the serviceID is the Service ID as described above for broadcast for the main subchannel, prepended with a 5 and zero or one zeroes (0) such that the result is a 5-digit number. For example, if the broadcast service ID was 4203, the service ID used by the app will be 54203. |
| global ServiceID | 1 | A globally unique URI that identifies the ATSC 3.0 Service. For Aspect reporting, this is the short call sign followed by the short name of the station as assigned by Rovi. For WKAW: "urn:v1000.tv/WKAW/WKAWDT" |
| serviceType | 1 | Type of service; for an app-based service, this value is 3. |
| reportInterval | 1 . . . N | Reporting interval |
| startTime | 1 | Start time of reporting interval |
| endTime | 1 | End time of reporting interval |
| DestinationDeviceType | 1 | Destination device type. For a device using its primary display, this value is 0. If a device's output is being directed to a remote screen (e.g. via iOS AirPlay or Google Cast), this value is 1. |
| ContentID | 0 . . . 1 | Content ID, which is either EIDR. Ad-ID, or a clip ID. If none of these IDs are known, do not include this element. |
| type | 1 | If EIDR or Ad-ID are known, "EIDR" or "Ad-ID". For Aspect reporting of a clip that does not have an EIDR or Ad-ID assigned, use the following value to indicate that "Clip ID" is being used, the broadcaster's call sign for CALL: tag:aspect.us,2017:CALL For example, tag:aspect.us,2017:WKAW |
| cid | 1 | For EIDR and Ad-ID, this is a patterned string. If using a Clip ID, use an ID that uniquely references this clip within the A/V service. These strings are described in the information following this table. |
| broadcastInterval | 1 . . . N | Interval of content that is presented at a particular speed |
| broadcastStartTime | 1 | Start time of the interval when content is presented at a particular speed on the broadcast timeline The start time can be recovered using the Aspect watermark and the ATSC recovery mechanisms. If the Aspect watermark detector or the content stream is not available, use the airdate from the content metadata (e.g., "tsairdate"). If the content is not viewed from the beginning of the clip, use the video position data to determine the broadcastStartTime. If no airdate is available, set this to be the UTC datetime that the app began displaying the content. |
| broadcastEndTime | 1 | End time of the interval when content is presented at a particular speed on the broadcast timeline The end time can be recovered using the last Aspect watermark detected and the ATSC recovery mechanisms. If the Aspect watermark detector or the content stream is not available, add the duration of the viewing of the content to the broadcastStartTime. If the broadcastStartTime is not available, set this to be the UTC datetime that the app stopped displaying the content. |
| speed | 0 . . . 1 | A floating point number that indicates the playback speed |

| Field | Cardinality | Description |
| --- | --- | --- |
| receiverStartTime | 1 | Start time of the interval when content is presented at a particular speed on the receiver timeline |
| Component | 1 ... N | Individual content components within a given channel. For Aspect reporting, only one component, audio, is currently needed. |
| componentType | 1 | Type of the component (e.g. audio, video, closed caption, etc.). For audio, this value is 0 |
| componentRole | 1 | Role of the component, For "complete main" audio, this value is 0 |
| componentName | 0 ... 1 | Human readable name of the component. For Aspect reporting, this element can be omitted. |
| componentID | 1 | ComponentID. The value of this element should be the same as the asset_id in the MPEG Media Transport Package (MMTP) table corresponding to this component. For Aspect reporting, this value should be "NOTREPORTED". |
| componentLang | 0 ... 1 | Component Language; typically, English (value = "en") or Spanish (value = "es" per ISO 639-1 via BCP 47. |
| startTime | 1 | Start time of the interval when content component is presented |
| endTime | 1 | End time of the interval when content component is presented |
| SourceDeliveryPath | 1 ... N | Delivery path used for or the source of the content component being consumed |
| type | 1 | Type of delivery path used for or source of the content component being consumed For an app, this will typically be 5 (delivered over IP via an intermediary). |
| startTime | 1 | Start time of the interval when content component is received via indicated delivery path or from the source |
| endTime | 1 | End time of the interval when content component is received via indicated delivery path or from the source | protocolVersion—This field shall contain the major and minor protocol versions of the syntax and semantics of the CDM, coded as hexadecimal values each in the range 0x0 to 0xF. The overall protocolVersion will be coded as a concatenated string of the form "0x<major protocol version as hexadecimal digit><minor protocol version as hexadecimal digit>". A change in the major version level shall indicate a non-backward-compatible level of change. The initial value of this field shall be 0. The value of this field shall be incremented by one each time the structure of the CDM is changed in a non-backward compatible manner from a previous major version. The second number is the CDM's minor version, which shall represent the minor version of the syntax and semantics of the CDM. A change in the minor version level for each value of the first number shall indicate a backward-compatible level of change within that major version. The initial value is 0. The value of this field shall be incremented by one each time the structure of the CDM is changed in backward-compatible manner from a previous minor change (within the scope of a major revision).

DeviceInfo—The consumption device information.

DeviceInfo.deviceID—A field that shall identify the consumption device identifier. A value of "NOTREPORTED" indicates that the consumption device identifier is intentionally not revealed.

DeviceInfo.deviceModel—A field that shall identify the consumption device model (e.g., XYZ-NG3400). A value of "NOTREPORTED" indicates that the consumption device model is intentionally not revealed.

DeviceInfo.deviceManufacturer—A field that shall identify the consumption device manufacturer (e.g. ABC company). A value of "NOTREPORTED" indicates that the consumption device manufacturer is intentionally not revealed.

DeviceInfo.deviceOS—A field that shall identify the consumption device operating system and version (e.g. iOS 9.0.2, Android 5.0.1). A value of "NOTREPORTED" indicates that the consumption device operating system is intentionally not revealed.

DeviceInfo.peripheralDevice—A field that shall identify if the consumption device is an external peripheral (e.g. a ATSC tuner dongle). A value of "NOTREPORTED" indicates that it is intentionally not revealed if the consumption device is external or not.

DeviceInfo.deviceLocation—An object that shall identify the last known location of the consumption device.

DeviceInfo.deviceLocatlon.latitude—A field that shall contain the latitude of the last known device location coded in decimal degrees format (e.g. "[+−]DDD.DDDDD") as a string. A value of "NOTREPORTED" indicates that the device location is intentionally not revealed.

DeviceInfo.deviceLocation.longitude—A field that shall contain the longitude of the last known device location coded in decimal degrees format (e.g. "[+−]DDD.DDDDD") as a string. A value of "NOTREPORTED" indicates that the device location is intentionally not revealed.

DeviceInfo.clockSource—An unsigned integer that shall contain the source of the time that has been set in the device clock.

0—device clock has been set manually by the user

1—device clock has been set automatically by a service

AVService—This element contains the list of zero or more elements describing activity intervals based on content delivered continuously. For Aspect reporting, there shall be one or more elements.

country—Country code associated with the primary administrative entity under which the value provided in bsid is assigned, using the applicable alpha-2 country code format as defined in ISO 3166-1.

bsid—Identifier of the whole broadcast stream.

serviceID—This value of serviceID identifies the service associated with the usage data in this AVService element.

globalServiceID—This globally unique URI identifies the service associated with the usage data in this AVService element.

serviceType—The value of the field @serviceCategory.

reportInterval—One or more periods of display of content for this AVService.

reportInterval.startTime—The UTC dateTime at the beginning of the event. Intervals shall begin when display of the content begins.

reportInterval.endTime—The UTC dateTime at the end of the event. Intervals shall end when display of the content ends.

DestinationDeviceType—An unsigned integer denoting the class of usage or device type (presentation device). Defined values are:

0—Content is presented on a Primary Device
   1—Content is presented on a Companion Device
   2—Content is sent to a Time-shift-buffer
   3—Content is sent to a Long-term storage
   4 to 255—Reserved.

ContentID—This field shall identify the content associated with this instance of reportInterval. This field is required if the ContentID is available to the device.

ContentID.type—A field that is required when ContentId element is included. Two values are defined currently by ATSC:
"EIDR" indicates a content identification per the EIDR registry (http://eidr.org).
"Ad-ID" indicates a content identifier per the Ad-ID registry (http://ad-id.org).
For Aspect reporting, an additional value is defined, using the "tag:" format:
"tag:aspect.us, 2017:CALL" indicates the station that is the source of the content in the "CALL" field of the identifier. For example, content from WKAW will have a ContentID.type of tag:aspect.us, 2017:WKAW
ContentID.cid—A field that is required when ContentId element is included that provides the content identification for this reportInterval element. The type of content identifier shall be as given in the ContentID.type attribute. Either an EIDR (34-character canonical form with hyphens) or Ad-ID (11 or 12-character canonical form) can be included.
If using a Clip ID, insert the broadcaster's unique identifier (BUID) for the clip into this field.
For example, the content of the HTTP "Referer" element, without the hostname of the URL, and without arguments such as "Autostart", could be used as the BUID.
For live content, prepend "L-" to the BUID.
For non-live content, prepend "P", followed by the duration of the clip in integer seconds, followed by a dash (-). If the duration is not known, omit the duration.
For example, if a clip of unknown length has an BUID of video?videoId=123455678&videoVersion=1.0
The value would be P-video?videoId=123455678&videoVersion=1.0
For a 2-minute clip with an BUID of
clip/12345678/content-title-headline?autostart=true
The value would be P120-clip/1234567/content-title-headline
For a live clip with a BUID of
watch-live
The value would be L-watch-live
broadcastInterval—An interval when content is presented at a particular speed.
broadcastIInterval.broadcastStartTime—The UTC dateTime on the broadcast timeline at the beginning of the interval when content is presented at a particular speed indicated by broadcastIntervalspeed.
broadcastInterval.broadcastEndTime—The UTC dateTime on the broadcast timeline at the end of the interval when content is presented at a particular speed indicated by broadcastInterval.speed.
broadcastInterval.speed—A floating point number that indicates the playback speed with the value:
=0—indicates paused playback
>0—indicates forward playback at the indicated speed. The value 1 indicates a playback at the normal speed, the value greater than 1 indicates fast forward playback and the value between 0 and 1 indicates slow forward playback
<0—indicates backward playback at the indicated speed. The value −1 indicates backward playback at the normal speed, the value less than −1 indicates fast backward playback, and the value between 0 and −1 indicates slow backward playback
When broadcastInterval.speed is not included then it is inferred to be equal to 1.
The value of broadcastInterval.speed should be evaluated to the nearest 0.1 for the purposes of determining speed change or classifying trick modes.

The value of broadcastInterval.speed should be related to the other entries as follows:
(i−1)'th broadcast.speed should be equal to difference between (i−1)'th array entries (broadcastInterval.broadcastEndTime—broadcastInterval.broadcastStartTime) divided by the difference between i'th array entry broadcastInterval.receiverStartTime minus (i−1)'th array entry broadcastIInterval.receiverStartTime.
broadcastInterval.receiverStartTime—The UTC dateTime on the receiver timeline at the beginning of the interval when content is presented at a particular speed. Any of the value receiverStartTime shall not be less than the value of startTime property of this reportInterval instance and shall not be greater than the value of endTime attribute of this reportInterval instance. They shall obey following constraints:
The value i'th array entry broadcastInterval.receiverStartTime shall not be less than or equal to value of (i−1)'th array entry broadcastInterval.receiverStartTime.
The value of 1st array entry broadcastInterval.receiverStartTime shall be equal to the value reportInterval.StartTime.
1 to N array entries for receiver timeline indicated by broadcastInterval.receiverStartTime shall span entire reportInterval period from reportInterval.startTime to reportInterval.endTime in a non-overlapping manner.
Component—Content component type, role, name, ID and time interval information. A component is present and shall be reported in the Component field only if it is presented on a Primary Device or Companion Device or sent to a Time-shift-buffer or Long-term storage, as specified in DestinationDeviceType field. A component shall not be reported in the Component field if it is not presented on any Primary Device or Companion Device, nor sent to any Time-shift-buffer or Long-term storage.
Component.componentType—The type of component is indicated. Value of 0 shall indicate an audio component. Value of 1 shall indicate a video component. Value of 2 shall indicate a closed caption component. Value of 3 shall indicate an application component. Values 4 to 255 shall be reserved.
Component.componentRole—A unsigned byte that shall represent the role or kind of the component. In this case, the componentRole attribute shall be interpreted as follows:
For audio component (when componentType value above is equal to 0) values of componentRole shall be as defined in section "User Service Description for MMTP—Semantics" of A/331.
For Video (when componentType value above is equal to 1) values of componentRole shall be as follows: 0=Primary video, 1-254=reserved, 255=unknown.
For Closed Caption component (when componentType value above is equal to 2) values of componentRole shall be as follows: 0=Normal, 1=Easy reader, 2-254=reserved, 255=unknown.
When componentType value above is between 3 to 255, inclusive, the componentRole shall be equal to 255.
Component.componentName—A string representing the human-readable name of the component.
Component.componentId—A string representing component identifier.
Component.componentLang—A string representing component language.
Component.startTime—the UTC dateTime at the beginning of the event. Interval shall begin when display of this content component begins within the time period defined by the reportInterval instance. The value shall not be less than the value of startTime attribute of this reportInterval instance.

Component.endTime—the UTC dateTime at the end of the event. Interval shall end when display of this content component ends within the time period defined by the reportInterval instance. The value shall not be greater than the value of endTime attribute of this reportInterval instance.

Component.SourceDeliveryPath—Delivery path used for or the source of the content component indicated by the parent Component element.

SourceDellveryPath.type—
- 0—Broadcast delivery (content component is delivered by broadcast)
- 1—Broadband delivery (content component is delivered directly by broadband by broadcaster)
- 2—Time-shift-buffer source (content source is local time shift buffer)
- 3—Hard-drive source (content source is local hard drive)
- 4—Delivery via direct connection (HDMI)
- 5—Alternate IP delivery (content component is delivered via intermediary)
- 6 to 255—Reserved.

SourceDeliveryPath.startTime—the UTC dateTime at the beginning of the event, within the time interval defined by the parent Component element. Interval shall begin when the delivery of content component begins on the path or from the source indicated by the value of type attribute. The value shall not be less than the value of startTime attribute of the parent Component element.

SourceDeliveryPath.endTime—the UTC dateTime at the end of the event, within the time interval defined by the parent Component element. Interval shall end when the delivery of content component ends on the path or from the source indicated by the value of type attribute. The value shall not be greater than the value of endTime attribute of the parent Component element.

EXAMPLES

Use Case 1: Live Stream

```
{
    "CDM":{
        "protocolversion": "0x00",
        "DeviceInfo":[
            {
                "deviceID":"WKAWDTb8:27:eb:1f:ce:46",
                "deviceMode1":"Moto X",
                "deviceManufacturer":"Motorola",
                "deviceOS":"Android 5.1",
                "peripheralDevice":"FALSE",
                "deviceLocation":{
                    "latitude":"+32.7157",
                    "longitude":"-117.1611"
                }
            }
        ],
        "AVService": [
            {
                "country":"US",
                "bsid":4,
                "serviceID":50901,
                "globalServiceID":"urn:v1000.tv/WKAW/WKAWDT",
                "serviceType":3,
                "reportInterval":[
                    {
                        "startTime":"2017-03-26T22:48:44.683Z",
                        "endTime":"2017-03-26T22:49:17.705Z",
                        "DestinationDeviceType":0,
                        "ContentID":{
                            "type":"tag:aspect.us,2017:WKAW",
                            "cid":"L-watch-live"
                        },
                        "BroadcastInterval":[
                            {
                                "receiverStartTime":"2017-03-26T22:48:44.683Z",
                                "broadcastStartTime":"2017-03-26T22:48:44.683Z"
                                "broadcastEndTime":"2017-03-26T22:49:17.705Z",
                                "speed":1.0
                            }
                        ],
                        "Component":[
                            {
                                "componentType":0,
                                "componentRole":0,
                                "componentID":"NOTREPORTED",
                                "componentLang":"en",
                                "startTime":"2017-03-26122:48:44.683Z",
                                "endTime":"2017-03-26T22:49:17.705Z",
                                "SourceDeliveryPath":[
                                    {
                                        "type":5,
                                        "startTime":"2017-03-26T22:48:44.683Z",
                                        "endTime":"2017-03-26T22:49:17.7 05Z"
                                    }
```

```
                    ]
                }
            ]
        }
    ]
},
}
```

Use Case 2: Recorded Content Stream

This example includes the case where the device is showing content on a remote screen, and the broadcast time is known by the application. The differences between this example and Use Case 1 are highlighted in bold.

```
{
    "CDM":{
        "protocolVersion":"0x00",
        "DeviceInfo":[
            {
                "deviceID":"WKAWDTb8:27:eb:1f:ce:46",
                "deviceModel":"Moto X",
                "deviceManufacturer":"Motorola",
                "deviceOS":"Android 5.1",
                "peripheralDevice":"TRUE" ,
                "deviceLocation":{
                    "latitude":"+32.7157",
                    "longitude":"−117.1611"
                }
            }
        ],
        "AVService":[
            {
                "country":"US",
                "bsid":4,
                "serviceID":50901,
                "globalServiceID":"urn:v1000.tv/WKAW/WKAWDT",
                "serviceType":3,
                "reportInterval":[
                    {
                        "startTime":"2017-03-26T22:48:44.683Z",
                        "endTime":"2017-03-26T22:49:17.705Z",
                        "DestinationDeviceType":1,
                        "ContentID":{
                            "type":"tag:aspect.us,2017:WKAW",
                            "cid":"P300-clip/12345678-Local-Hero-Rescues-Toddler"
                        },
                        "BroadcastInterval":[
                            {
                                "receiverStartTime":"2017-03-26T22:48:44.683Z",
                                "broadcastStartTime":"2017-03-23T12:27:40.572Z",
                                "broadcastEndTime":"2017-03-23T12:28:13.594Z",
                                "speed":1.0
                            }
                        ],
                        "Component":[
                            {
                                "componentType":0,
                                "componentRole":0.
                                "componentID":"NOTREPORTED",
                                "componentLang":"en".
                                "startTime":"2017-03-26T22:48:44.683Z",
                                "endTime":"2017-03-26T22:49:17.705Z",
                                "SourceDeliveryPath":[
                                    {
                                        "type":5,
                                        "startTime":"2017-03-26T22:48:44.683Z",
                                        "endTime":"2017-03-26T22:49:17.705Z"
                                    }
                                ]
                            }
                        ]
                    }
                ]
            }
```

```
        ],
    }
}
```

Use Case 3: Recorded Content Stream from Another Station

This example includes the case where the device is using Spanish language audio, from station WTAN. The differences between this example and Use Case 1 are highlighted in bold.

```
{
    "CDM":{
        "protocolVersion":"0x00",
        "DeviceInfo":[
            {
                "deviceID":"WKAWDTb8:27:eb:1f:ce:46,
                "deviceModel":"Moto X",
                "deviceManufacturer":"Motorola",
                "deviceOS":"Android 5.1",
                "peripheralDevice":"FALSE",
                "deviceLocation":{
                    "latitude":"+32.7157",
                    "longitude":"-117.1611"
                }
            }
        ],
        "AVService":[
            {
                "country":"US",
                "bsid":4,
                "serviceID":55202,
                "globalServiceID":"urn:v1000.tv/WTAN/WTANDT",
                "serviceType":3,
                "reportInterval":[
                    {
                        "startTime":"2017-03-26T22:48:44.683Z",
                        "endTime":"2017-03-26T22:49:17.705Z",
                        "DestinationDeviceType": 0,
                        "ContentID":{
                            "type":"tag:aspect.us,2017:WTAN",
                            "cid":"P120-clip/12345678-20948-9872-1"
                        },
                        "BroadcastInterval":[
                            {
                                "receiverStartTime":"2017-03-26122:48:44.683Z",
                                "broadcastStartTime":"2017-03-26T22:48:44.683Z"
                                •broadcastEndTime":"2017-03-26T22:49:17.705Z",
                                "speed":1.0
                            }
                        ],
                        "Component":[
                            {
                                "componentType":0,
                                "componentRole":0,
                                "componentID":"NOTREPORTED",
                                "componentLang":"es",
                                "startTime":"2017-03-26T22:48:44.683Z",
                                "endTime":"2017-03-26T22:49:17.705Z",
                                "SourceDeliveryPath":[
                                    {
                                        "type":5,
                                        "startTime":"2017-03-26T22:48:44.683Z",
                                        "endTime":"2017-03-26T22:49:17.705Z"
                                    }
                                ]
                            }
                        ]
                    }
                ]
            }
        ],
    }
}
```

Figure 26:
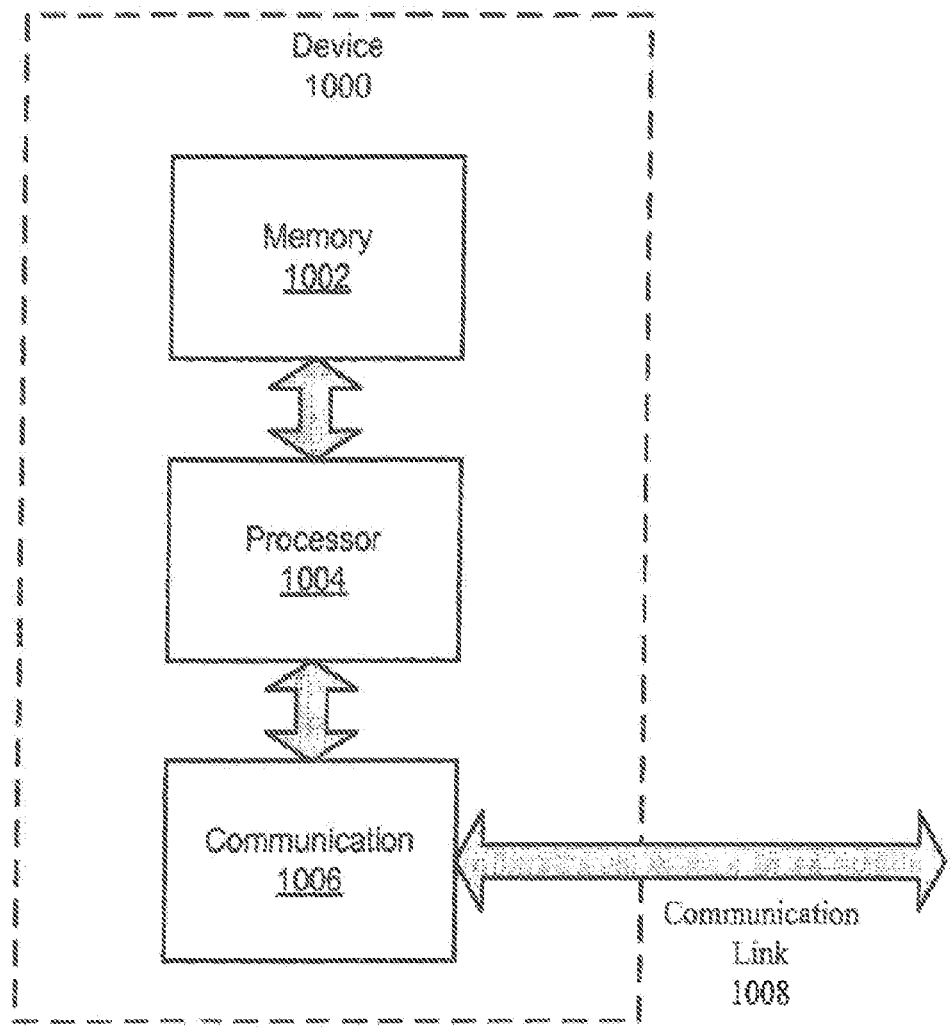
FIG. 26 illustrates a block diagram of a device that can be used for implementing various disclosed embodiments.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 26 illustrates a block diagram of a device 1000 within which the various disclosed embodiments may be implemented. The device 1000 comprises at least one processor 1002 and/or controller, at least one memory 1004 unit that is in communication with the processor 1002, and at least one communication unit 1006 that enables the exchange of data and information, directly or indirectly, through the communication link 1008 with other entities, devices and networks. The communication unit 1006 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 26 the device 1000 and the like may be implemented in software, hardware, firmware, or combinations thereof. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of generating a signaling file comprising:
obtaining at a receiver device, a first version of multimedia content including audio and video components having watermarks embedded into at least one of the audio and video components, where the embedded watermarks include interval codes containing a first timing information, the multimedia content being received through a communication channel, wherein the first version of the multimedia content contains a metadata stream that includes second timing information for content samples in a second timing system;
decoding and rendering the received first version of the multimedia content while simultaneously: detecting watermarks on the first version of the multimedia content to obtain the first timing information for content samples in a first timing system, wherein the first timing information comprises an interval code that is associated with a received content sample; and extracting metadata from the metadata stream in the received first version of multimedia content, wherein the metadata includes a second timing information that is associated with a received content sample;
creating a signaling file once an interval code is extracted; and
making the signaling file available to receivers for content signaling.

2. The method of claim 1 wherein the second timing system is a DASH timeline specified by at least two types of metadata carried in the metadata stream including:
timing information in DASH MPD including period start time that specifies the start time of a period and MPD availability start time that is the anchor for the MPD in wall-clock time in UTC for live streaming; and
the presentation time of the content sample being rendered which is specified as an offset from the period start time and defined in one or more codecs.

3. The method of claim 2 wherein the signaling file created contains information selected from the group consisting of:
a mapping between the first timing system and the second timing system;
a description of the media component embedded with a watermark containing a payload containing a server code and interval code;
content identifier for the segment associated with the extracted service code and interval code;
service information of the content segment associated with the extracted service code and interval code including service identifiers;
service signaling including the URLs used by the receiver to report usage data and DASH MPD;
application signaling including URLs for downloading, launching and management of broadcast applications; and
dynamic events associated with the content segment from which the service code and interval code are extracted.

4. The method of claim 2 wherein creating a signaling file takes place at a location selected from the group consisting of:
a television production stage prior to the direct transmission to consumers;

a television station production stage prior to transmission to network operators; and a consumer receiver.

5. The method of claim 2 wherein the signaling file created contains information including a mapping between the first timing system and the second timing system;

wherein the mapping includes a vector having a first element representing timing information in a first timing system and a second element representing timing information in a second timing system, such that the first and second elements are associated with the same content sample being rendered.

\* \* \* \* \*